(12) United States Patent
Goto

(10) Patent No.: US 7,737,386 B2
(45) Date of Patent: Jun. 15, 2010

(54) FOCUS DETECTION OPTICAL SYSTEM HAVING A PLURALITY OF FOCUS DETECTION AREAS, AND IMAGING APPARATUS INCORPORATING THE SAME

(75) Inventor: Hisashi Goto, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/151,022

(22) Filed: May 1, 2008

(65) Prior Publication Data
US 2008/0283724 A1    Nov. 20, 2008

(30) Foreign Application Priority Data
May 15, 2007    (JP)    ............... 2007-128782

(51) Int. Cl.
G02B 7/04    (2006.01)
G02B 7/28    (2006.01)
(52) U.S. Cl. .................................. 250/201.2; 396/114
(58) Field of Classification Search ............. 250/201.2; 396/104, 114, 121; 359/618, 619
See application file for complete search history.

(56) References Cited

U.S. PATENT DOCUMENTS 4,185,191 A    1/1980    Stauffer 6,239,912 B1 *    5/2001    Ozawa ................. 359/618

FOREIGN PATENT DOCUMENTS

JP    57-49841    10/1982
JP    01-266503    10/1989

OTHER PUBLICATIONS

Photo Industrial November, Phase Difference Detection Method For AF Single-Lens Reflex Cameras (4), 1987, p. 107-109 (with English language translation).

* cited by examiner

Primary Examiner—Thanh X Luu
(74) Attorney, Agent, or Firm—Kenyon & Kenyon LLP

(57) ABSTRACT

The invention relates to a focus detection optical system used with the so-called autofocus (AF) system mounted on single-lens reflex cameras (SLRs) or the like, and an imaging apparatus incorporating it. The focus detection optical system comprises at least n focus detection areas that are adjacent to or intersect each other on a predetermined imaging plane, where $n \geq 2$. A re-imaging lens group comprises n+1 re-imaging lenses, A (n−1)th re-imaging lens and an nth re-imaging lens are a pair of re-imaging lenses that correspond to a (n−1)th focus detection area and are adjacent to each other. An nth re-imaging lens and a (n+1)th re-imaging lens are a pair of re-imaging lenses that correspond to the nth focus detection area and are adjacent to each other. The (n−1)th re-imaging lens and (n+1)th re-imaging lens are located at different positions.

2 Claims, 17 Drawing Sheets

FIG.1
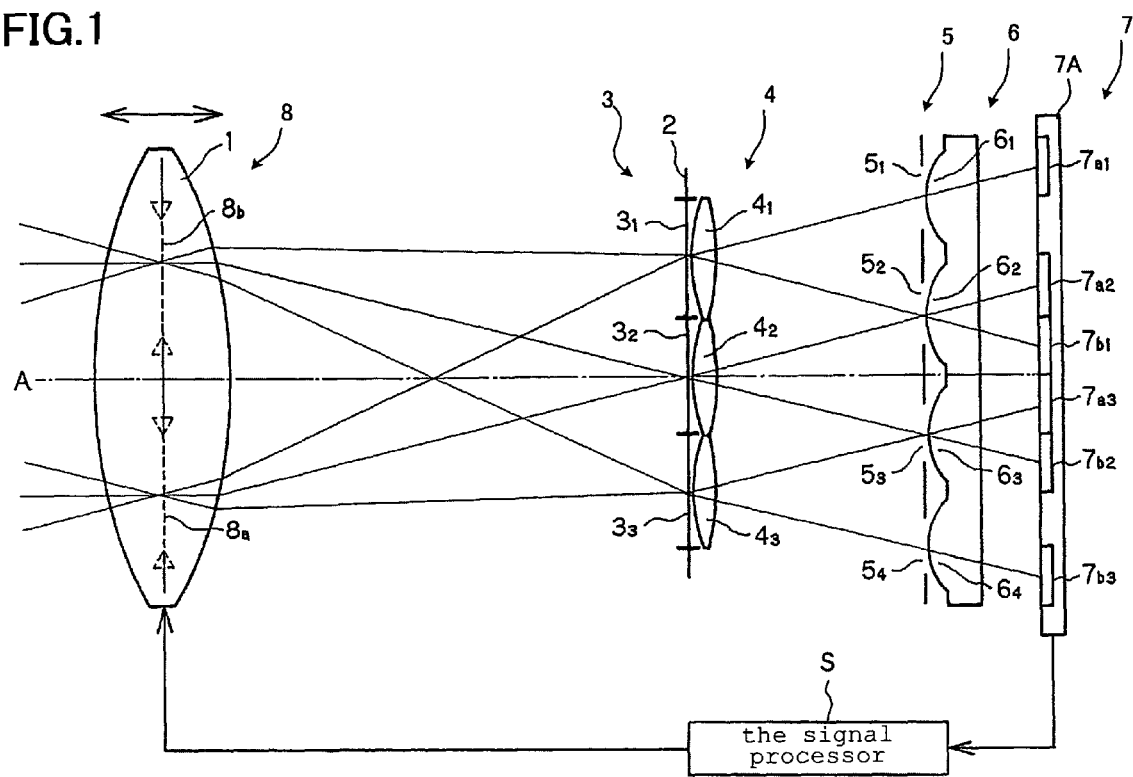
(a)
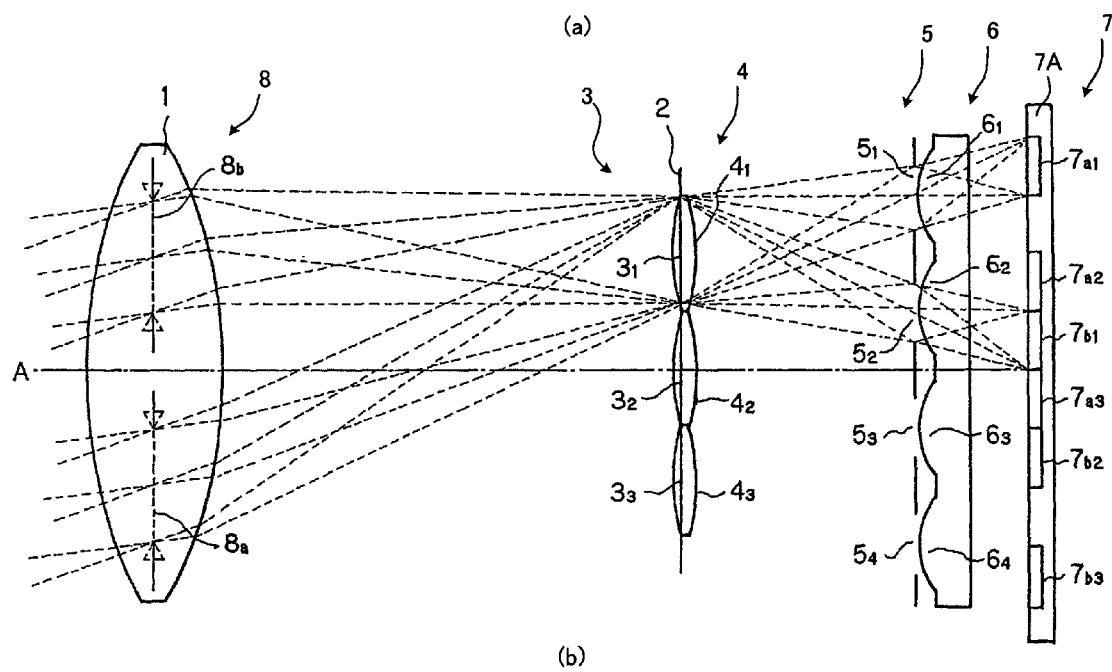
(b)

FIG.2
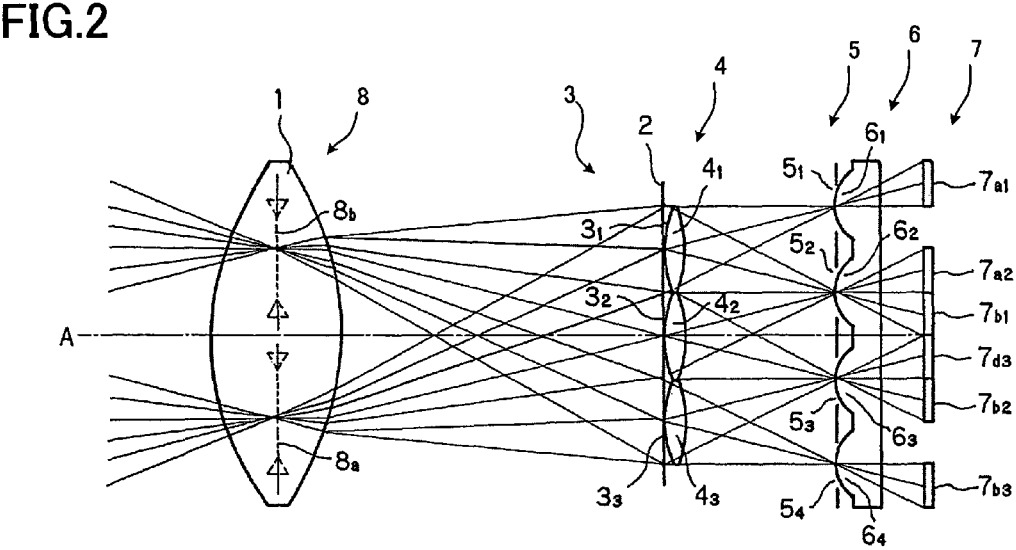
(a)
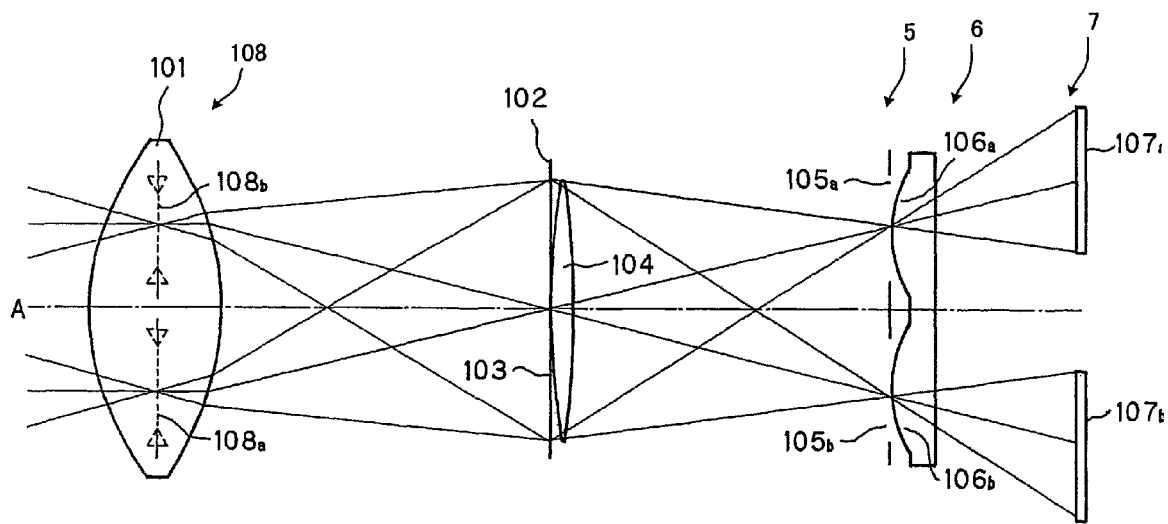
(b)

FIG.10
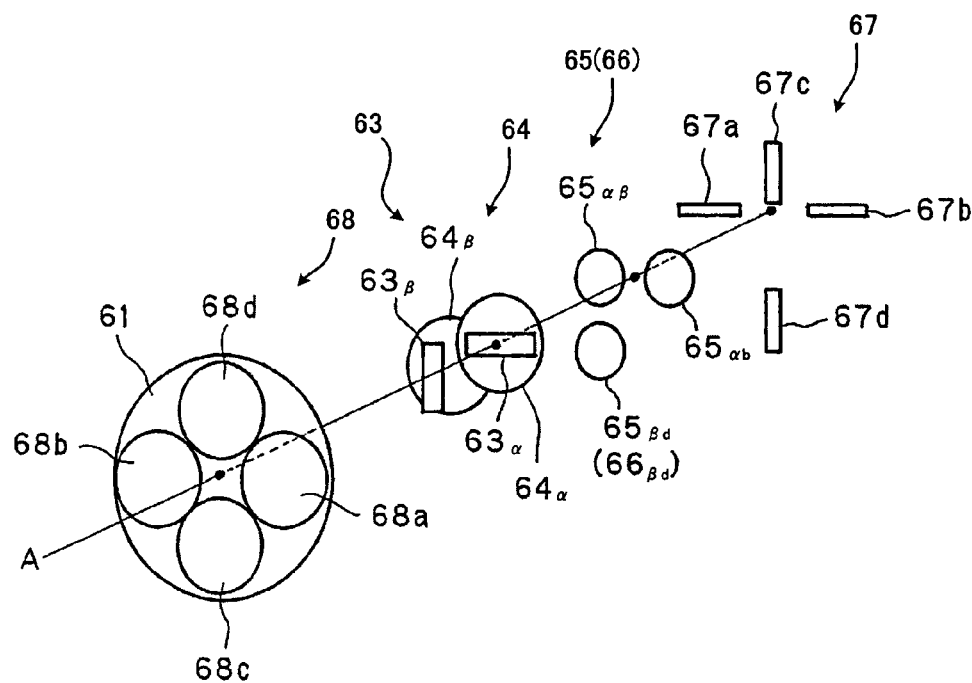
(a)
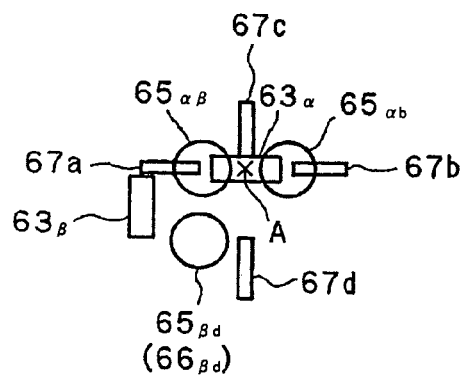
(b)

FIG.11
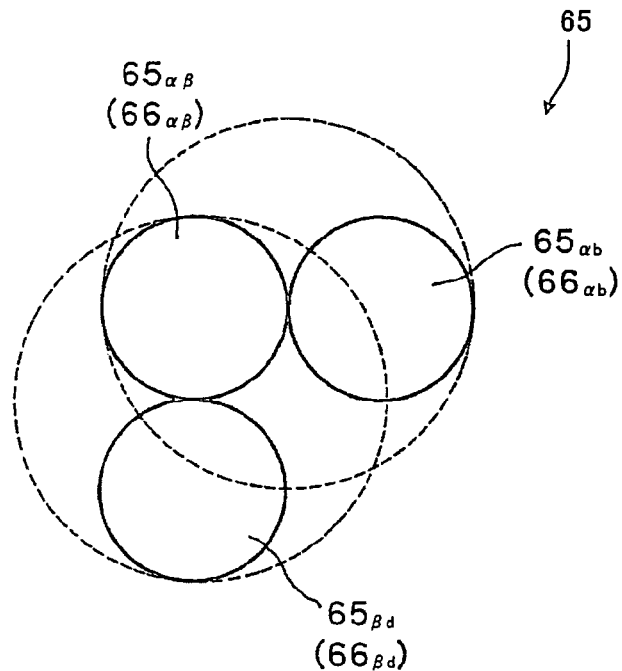
(a)
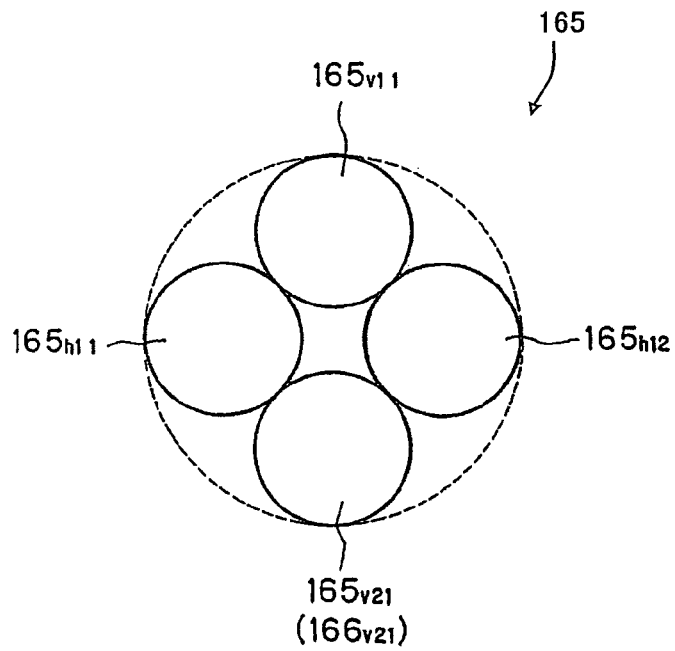
(b)

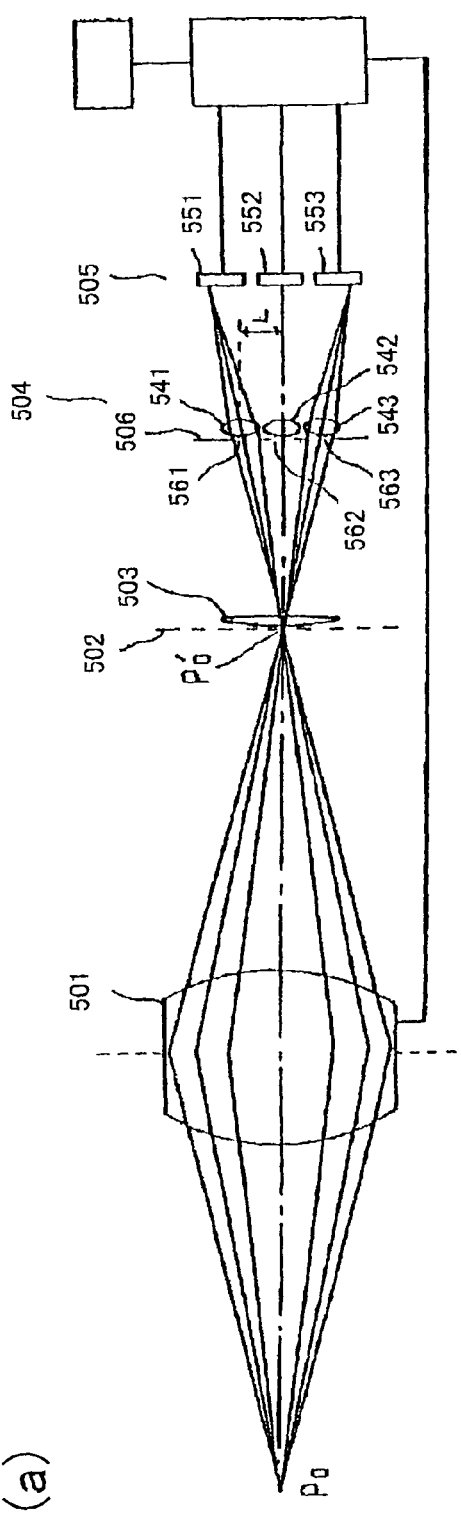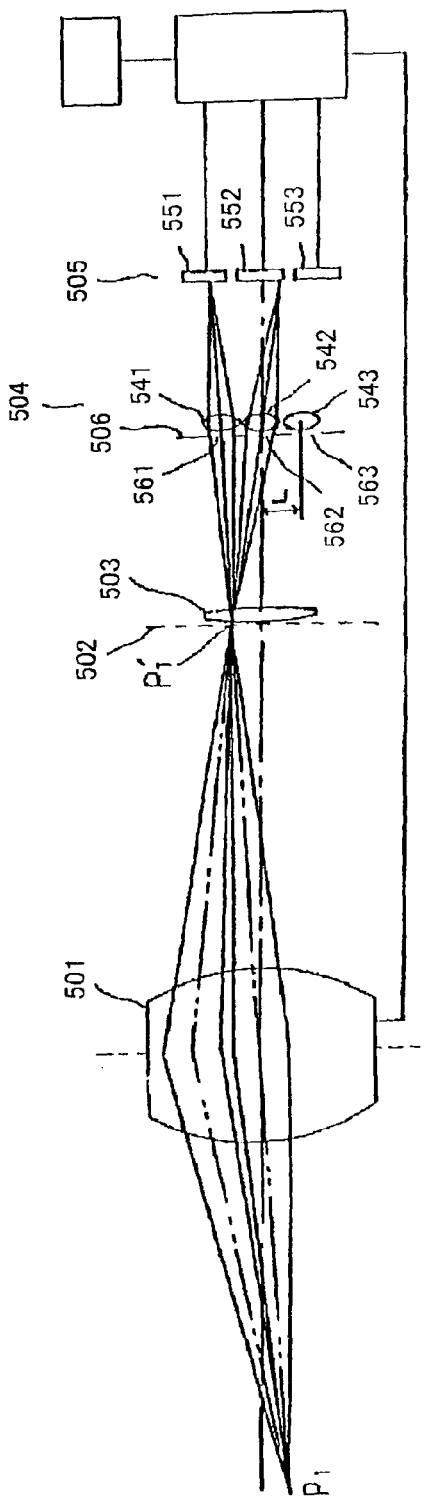
FIG.20 Prior Art
(a)
(b)

FOCUS DETECTION OPTICAL SYSTEM HAVING A PLURALITY OF FOCUS DETECTION AREAS, AND IMAGING APPARATUS INCORPORATING THE SAME

This application claims benefit of Japanese Application No. 2007-128782 filed in Japan on May, 15, 2007, the contents of which are incorporated by this reference.

BACKGROUND OF THE INVENTION

The present invention relates generally to a focus detection system used with the so-called phase difference type autofocus (AF) system mounted on single-lens reflex cameras (SLRs) or the like, and an imaging apparatus incorporating it. More particularly, the invention is concerned with a focus detection optical system that, with a taking lens defocused theoretically, enables a defocus direction and a defocus quantity to be so figured out that the taking lens can be more quickly placed in an in-focus state than achieved with the so-called contrast method, and an imaging apparatus incorporating it.

So far, there has been a system comprising a taking lens for projecting a subject onto an imaging plane, a means for splitting or selecting an optical path from the taking lens to the imaging plane (a quick return mirror or half-mirror), a primary imaging plane (predetermined imaging plane) set at a position roughly equivalent to said imaging plane on an optical path passing through them, a field stop located near that primary imaging plane to form a focus detection area, a condenser lens located near the primary imaging plane, aperture stops for implementing pupil division by a plurality of openings, and a plurality of re-imaging lenses and a light receptor element array located corresponding to the respective aperture stops, wherein the condenser lens is adapted to project different areas within the taking lens onto the respective aperture stops, and the re-imaging lenses are adapted to project an aerial image at the primary imaging position onto the light receptor element array through the corresponding aperture stops.

With this system, positions of images projected onto the light receptor element array corresponding to the focus detection area are compared to implement range finding, but constant areas at both ends of the focus detection area are where to obtain defocus information: the focus of the subject at that position cannot be detected.

Known as a typical prior art relying upon such a method is a focus detection system wherein, to implement detection for each of a plurality of focus detection areas, there are a pair of re-imaging lenses provided, and the respective re-imaging lenses are shared upon re-imaging of a plurality of focus detection areas (Patent Publication 1).

As shown in FIG. 20, the prior art comprises a re-imaging lens group 504 comprising a pair of re-imaging lenses corresponding to each of three focus detection areas lined up in one direction on a predetermined imaging plane. The re-imaging lens group 504 is made up of three re-imaging lenses 541, 542 and 543 lined up in one direction; both the outer re-imaging lenses 541 and 543 cooperate to implement focus detection for the center focus detection area, and one outer re-imaging lens 541 and the center re-imaging lens 542 cooperate to implement focus detection for the outer focus detection areas. The prior art also says that the focus detection system may just as well be located in the direction coming out of the paper.

Patent Publication 1
JP (A) 1-266503

However, this focus detection system is designed to implement focus detection using mutually spaced re-imaging lenses for the intermediate focus detection area. Such an optical layout is likely to have an increased angle of incidence to the re-imaging lenses and so be affected by aberrations. An attempt to decrease the angle of incidence to the re-imaging lenses would work against size reductions, because the distance between the focus detection areas and the re-imaging lens group grows long.

Further, the prior art comes up with a plurality of combinations, each comprising at least three re-imaging lenses, wherein a light receptor element array corresponding to the respective re-imaging lenses is independently set up. And focus detection at one range-finding area is implemented by detecting a phase difference in one direction: phase difference information obtained by only one set of re-imaging lenses.

With such an arrangement, an attempt to increase focus detection area size would increase the angle of incidence on each re-imaging lens in the re-imaging lens group, and so tend to produce aberrations. An effort to keep the aberrations in check would bring the re-imaging lenses away from the focus detection area, again working against size reductions.

In view of such problems with the prior art as mentioned above, the invention has for its object to provide a focus detection optical system that comprises a plurality of closely located focus detection areas and is easily capable of making sure focus detection capability while a re-imaging lens group gets close to the focus detection areas, and an imaging apparatus incorporating it. Another object of the invention is to provide a focus detection optical system that has a wide focus detection area and is less affected by aberrations, and an imaging apparatus incorporating it.

SUMMARY OF THE INVENTION

To accomplish the aforesaid objects, the invention provides a focus detection optical system, comprising a condenser lens located near a focus detection area on a predetermined imaging plane for a taking lens, a pupil division stop having a pair of openings arranged at a spacing wide enough to make sure focusing precision corresponding to said focus detection area, a re-imaging lens group having a plurality of re-imaging lenses located corresponding to said openings, and a light receptor element array located at imaging positions set by said re-imaging lenses, wherein said light receptor element array is adapted to receive a light intensity distribution of double beams passing through different areas of said taking lens and then through said focus detection area to detect a phase difference of an output signal indicative of a light intensity distribution obtained from said light receptor element array, thereby implementing focus detection for said focus detection area, characterized in that said focus detection optical system comprises at least n such focus detection areas that are adjacent to or intersect each other on said predetermined imaging plane, where $n \geq 2$; said re-imaging lens group comprises n+1 such re-imaging lenses; a (n−1)th re-imaging lens and an nth re-imaging lens are a pair of re-imaging lenses that correspond to said (n−1)th focus detection area and are adjacent to each other; an nth re-imaging lens and a (n+1)th re-imaging lens are a pair of re-imaging lenses that correspond to said nth focus detection area and are adjacent to each other; and said (n−1)th re-imaging lens and said (n+1)th re-imaging lens are located at different positions.

Thus, each of the n adjoining or intersecting focus detection areas may be set up with a pair of adjoining openings and a pair of adjoining re-imaging lenses. And the respective re-imaging lenses being adjacent to each other renders it easy to make the angle of incidence of light rays on them small and keep aberrations in check, even when the distance between the focus detection area and the re-imaging lens is shorter.

Especially if the aforesaid nth and (n+1)th re-imaging lenses are located corresponding to the aforesaid nth focus detection area, it is easy to achieve more simplified arrangement and increase opening size, because (n+1) re-imaging lenses can be used to implement focus detection for the adjoining or crossing n focus detection areas.

It is also easy to bring the respective focus detection areas close to one another because of no need of making the focus detection systems independent from the respective focus detection areas.

A pair of re-imaging lenses corresponding to one focus detection area being adjacent to each other contributes to slimming down the focus detection system, because it is easy to prevent light rays from entering the same light receptor element array from a plurality of focus detection area.

Consequently, there can be a focus detection system provided, which is simplified in the construction of pupil division stops and re-imaging lens group, comprises a plurality of focus detection areas that can be easily close to one another and facilitates making sure focus detection capability while the re-imaging lens group is kept close to the focus detection areas.

For instance, when, to make focus detection precision high, two pairs of pupil division stops and re-imaging lenses differing in the direction that they are lined up are used in correspondence to vertical and horizontal lines on a subject, too, it is possible to make openings in the pupil division stops large.

By definition, that the focus detection areas are "adjacent to one another" here means that between the centers of the mutual focus detection areas, there is no focus detection area capable of detecting a phase difference in the direction of connecting the centers of the mutual focus detection areas.

Also, that the re-imaging lenses in pair form are "adjacent to each other" here means that on a line of connecting the centers of the effective surfaces of a pair of re-imaging lenses, there is none of the effective surface of other re-imaging lens.

According to the invention, for instance, three focus detection areas may be set up with four pupil division stops and four re-imaging lenses; typically, (n+1) pupil division stops and (n+1) re-imaging lenses may be used for n focus detection areas.

The focus detection optical system of the invention is further characterized in that said openings corresponding to said first to (n+1)th re-imaging lenses are lined up in a row, and said first to nth focus detection areas are lined up in a row as well.

This arrangement enables the focus detection system to comprise n focus detection areas that can be close to one another in the direction that they are lined up, and makes it easy to bring re-imaging lenses corresponding to the respective focus detection areas close to one another.

The focus detection optical system of the invention is further characterized in that the light receptor element arrays corresponding to said first to (n+1)th re-imaging lenses are located on the same light receptor member.

The provision of the respective light receptor element array on a single light receptor member goes in favor of making sure focus detection precision because of keeping light receiving performance from varying from light receptor member to light receptor member.

The focus detection optical system of the invention is further characterized in that the pair of openings corresponding to the first to nth focus detection areas are lined up in the same direction, and one piece of phase difference information is detected of light intensity distributions across a plurality of focus detection areas out of said first to nth focus detection areas.

By making the individual focus detection areas small thereby reducing a drop of detection precision due to aberration and drawing phase difference information out of the bulk of a plurality of focus detection areas, it is possible to set up a substantially wide focus detection area. It is also possible to increase a defocus quantity capable of focus detection.

The focus detection optical system of the invention is further characterized in that said plurality of focus detection areas are adjacent to each other, and said phase difference information is detected using a discontinuous intensity distribution separated for each focus detection area on the light receptor element array.

Thus, if there is a phase difference detected from a phase based on the adjoining focus detection areas, then it is possible to implement focus detection for a continuity of focus detection areas with improved focusing precision. It is also possible to implement a spot form of focus detection by a single focus detection area, an area form of focus detection changeover with a continuity of multiple focus detection areas, and selection of areas where focus detection is implemented, and so on.

The focus detection optical system of the invention is further characterized in that each one pair of openings corresponding to each of said plurality of adjoining focus detection areas have the same spacing.

This arrangement allows the defocus quantity and phase difference quantity for each focus detection area to have the same relations, facilitating focus detection.

The focus detection optical system of the invention is further characterized in that a conjugate position to said condenser lens of each one pair of openings corresponding to each of said plurality of adjoining focus detection areas is a pair of the same areas.

This arrangement enables an optical path through the taking lens to be efficiently laid out: by use of phase difference information about a light beam passing through the same area in the taking lens, focus detection precision can be improved.

The focus detection optical system of the invention is further characterized in that there are at least two rows of said openings lined up in a row, two such rows of said openings are arranged parallel with each other, there are at least two rows of said focus detection areas lined up in a row, and two such rows of said focus detection areas are arranged parallel with each other as well. It is thus possible to broaden an area having a focus detectable on the predetermined imaging plane.

The focus detection optical system of the invention is further characterized in that there are at least two rows of said openings lined up in a row, two such rows of said openings intersect each other, there are at least two rows of said focus detection areas lined up in a row, and two such rows of said focus detection areas intersect each other as well. It is thus possible to facilitate focus detection because an area having a focus detectable on the predetermined imaging plane can be widened, and there is a phase difference detectable in a different direction.

The focus detection optical system of the invention is further characterized in that there are a plurality of rows of said openings lined up in a row, said plurality of rows of said openings comprise a plurality of rows of mutually parallel openings and a plurality of rows of openings that intersect said plurality of rows of said parallel openings, there are a plurality of rows of said focus detection areas lined up in a row as well, and said plurality of rows of said focus detections areas comprise a plurality of rows of mutually parallel focus detection areas and a plurality of rows of focus detection areas that intersect said plurality of rows of mutually parallel focus detection areas. It is thus possible to facilitate focus detection because an area having a focus detectable on the predetermined imaging plane can be widened, and there is a phase difference detectable in a different direction.

The focus detection optical system of the invention is further characterized in that a direction that the openings corresponding to said (n−1)th and nth re-imaging lenses are lined up is different from a direction that said nth and (n+1)th re-imaging lenses are lined up. It is thus possible to facilitate focus detection because the phase difference information of the subject may be obtained not only from one direction but also from other directions.

The focus detection optical system of the invention is further characterized in that between said (n−1)th and nth focus detection areas there is none of other focus detection area, and one of said focus detection areas is positioned in a longitudinal direction of another.

It is thus preferable that the direction of the phase difference to be subjected to phase detection is placed close to a plurality of different focus detection areas, because the focus detection precision for a main subject can be increased.

Further, when one focus detection area is positioned on an extension of the longitudinal direction of another focus detection area, it is possible to make the whole focus detection area large.

On the other hand, as two pair of pupil division stops and re-imaging lenses lined up in different directions are used to allow two pairs of pupil division stops and re-imaging lenses to intersect, it is preferable because a spot form of focus detection can be implemented in correspondence to vertical and horizontal lines on a subject with improved focus detection precision.

Further, the intersecting focus detection areas may be taken as one focus detection area; this is preferable because of a decrease in the total number of focus detection areas. This leads to an increase in the integration density of focus detection areas corresponding to vertical and horizontal lines.

The focus detection optical system of the invention is further characterized in that said condenser lens comprises a plurality of optical axes corresponding to a plurality of said focus detection areas. Thus, by setting the optical axes of the condenser lens for each focus detection area, light beams passing through the taking lens can be efficiently laid out.

The focus detection optical system of the invention is further characterized by comprising field apertures located near said predetermined imaging plane and corresponding to the respective focus detection areas. It is thus possible to prevent crosstalk with other focus detection areas on the light receptor element array, thereby bringing the focus detection areas even closer to one another.

The focus detection optical system of the invention is further characterized by comprising a light block wall located just before said light receptor element array for each imaging area of the light receptor element array. It is thus possible to prevent crosstalk with other focus detection areas on the light receptor element array, thereby bringing the focus detection areas even closer to one another.

The focus detection optical system of the invention is further characterized in that said pupil division stop has at least two pairs of openings lined up in different directions at a spacing wide enough to make sure focusing precision corresponding to any one of said focus detection areas, the re-imaging lens group has a re-imaging lens located corresponding to each of said at least two pairs of openings, and said light receptor element array has a light receptor element array located at an imaging position by said re-imaging lens.

By use of two pairs of aperture stops and re-imaging lenses located corresponding to the same focus detection area and lined up in different direction, it is possible to increase focus detection precision in correspondence to vertical and horizontal lines on a subject. This is also preferable not only because the total number of focus detection areas can be decreased but also because the integration density of focus detection areas corresponding to the vertical and horizontal lines can be increased.

The focus detection optical system of the invention is further characterized in that said re-imaging lens group comprises a plurality of re-imaging lenses that are located regularly in a planar fashion, and said light receptor element array comprises a plurality of light receptor elements that are located regularly in a planar fashion.

Consequently, there is an increase in the degree of flexibility in combinations of the adjoining re-imaging lenses in pairs with the corresponding light receptor element array. Also, by a choice of the light receptor element array used, it is possible to increase the degree of flexibility in the selection of focus detection areas for which focus detection is to be implemented.

Further, the invention provides an imaging apparatus, comprising an imaging device adapted to take an image formed by a taking lens, a focus detection optical system, and a reflective member adapted to reflect a light beam from said taking lens and guide said light beam to a predetermined imaging plane, characterized in that said reflective member retracts out of a taking optical path when the image is taken by said imaging device. By the retraction of the reflective member when an image is taken by the imaging device, it is thus possible to provided an imaging apparatus that prevents a decrease in the quantity of light of an image taken by the imaging device.

Yet further, the invention provides an imaging apparatus, comprising an imaging device adapted to take an image formed by a taking lens, a focus detection optical system, and a reflective member adapted to reflect or transmit a light beam from said taking lens, characterized in that said imaging device is located on one of a reflective or transmissive side of said reflective member, and said focus detection optical system is located on another. It is thus possible to provide an imaging apparatus capable of implementing focus detection while images are being taken by the imaging device.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 is illustrative of the first embodiment of the invention of this application.

FIG. 2 is illustrative of comparisons of the first embodiment with a prior art.

FIG. 10 is illustrative of another embodiment of the invention of this application.

FIG. 11 is a layout view for pupil division stop apertures and re-imaging lenses.

FIG. 20 is illustrative of one prior art.

DESCRIPTION OF EXEMPLARY EMBODIMENTS

Exemplary embodiments of the invention are now explained inclusive of a general focus detection optical system and references examples.

Figure 15:
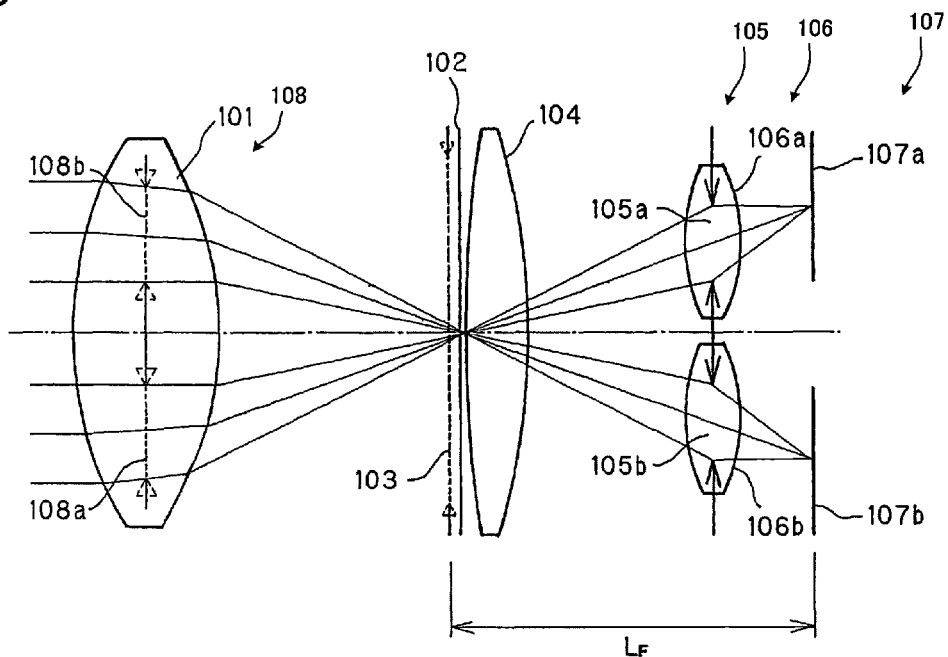
FIG. 15 is illustrative of a general phase difference type focus detection optical system.

A basics configuration of, and problems with, a general phase difference type focus detection optical system are now explained. FIG. 15 is a basic configuration of the phase difference type focus detection optical system. Located from a subject side are a taking optical system 101, a predetermined imaging plane 102 lying at a position equivalent to an imaging plane, a field stop aperture 103 (herein also called a field aperture) for a focus detection area set near the predetermined imaging plane 102, a condenser lens 104 located near the predetermined imaging plane 102, a pair of openings $105_a$ and $105_b$ (hereinafter also called a pair of pupil division apertures) in a pair of aperture stops (pupil division stops) for implementing pupil division, re-imaging lenses $106_a$ and $106_b$ located near the respective pupil division stop apertures, and photoelectric transformation portions $107_a$ and $107_b$ corresponding to the respective re-imaging lenses $106_a$ and $106_b$ (here, an array of light receptor elements that is an array of photoelectric transformation elements lined up in the direction that the aperture stop openings are lined up). Of these, what is defined by the field aperture 103, condenser lens 104, pupil division stop apertures $105_a$ and $105_b$, re-imaging lenses $106_a$ and $106_b$ and photoelectric transformation planes of the photoelectric transformation portions $107_a$ and $107_b$ provided on a light receptor member 107A is generally called a focal detection optical system.

The photoelectric transformation portion $107_a$, $107_b$ is a line sensor or the like, and it is often constructed in such a way as to produce the light intensity distribution of an image re-imaged on the sensor.

Suppose here that the taking lens 101 has therein a pair of virtual apertures $108_a$ and $108_b$ through which light beams are not shaded and which have a space enough for focus detection. Those apertures are preferably supposed to lie on the exit pupil of the taking lens 101; indeed, however, they are often set in consideration of the whole optical system, because there is much difficulty in keeping the exit pupil at a constant position as focusing, zooming, lens replacement or the like is implemented. The virtual aperture $108_a$ is conjugated by the condenser lens 104 to the opening $105_a$ in the pupil division stop, and the field aperture 103 is projected by the condenser lens 104 and re-imaging lens $106_a$ onto the light receiving plane of the photoelectric transformation portion $107_a$. Likewise, the virtual aperture $108_b$ is conjugated by the condenser lens 104 to the pupil division stop aperture $105_b$, and the field aperture 103 is projected by the condenser lens 104 and re-imaging lens $106_b$ onto the light receiving plane of the photoelectric transformation portion $107_b$.

The requirement here is that the images on the field aperture 103 projected onto the respective photoelectric transformation portions $107_a$ and $107_b$ do not overlap each other on the light receiving planes of the photoelectric transformation portions $107_a$ and $107_b$. The total length of the focal detection optical system is substantially determined by such specifications as the size of the field aperture 103, the magnification of the focal detection optical system, and the spacing between a pair of pupil division stop apertures $105_a$ and $105_b$.

Figure 16:
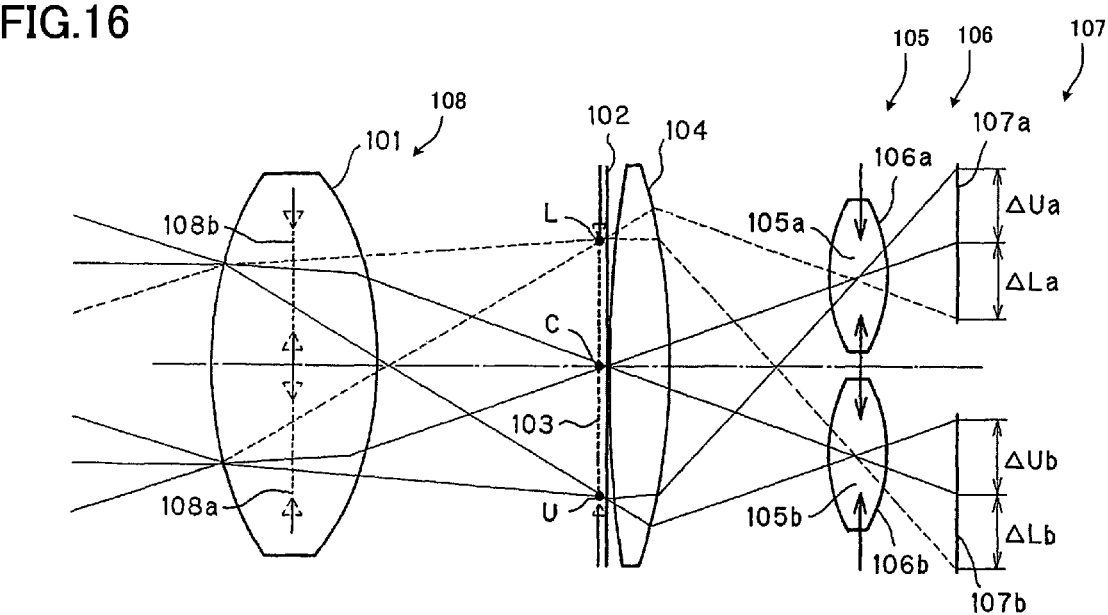
FIG. 16 is illustrative of a reference example.

FIG. 16 is illustrative in schematic of one of error factors due to aberrations of the focal detection optical system. In FIG. 16, $\Delta U_a$ is a distance between a center point C and a point U on the field aperture 103 as they are projected onto the light receiving plane of the photoelectric transformation portion $107_a$, $\Delta L_a$ is a distance between the center point C and a point L on the field aperture 103 as they are projected onto the light receiving plane of the photoelectric transformation portion $107_a$, $\Delta U_b$ is a distance between the center point C and the point U on the field aperture 103 as they are projected onto the light receiving plane of the photoelectric transformation portion $107_b$, and $\Delta L_b$ is a distance between the center point C and the point L on the field aperture 103 as they are projected onto the light receiving plane of the photoelectric transformation portion $107_b$. Note here that the distance between the center point C and the point L on the field aperture 103 is supposed to be the same as the distance between the center point C and the point U on the field aperture 103.

The phase difference type focus detection method involves estimation of the quantity of a misalignment between the light intensity distributions of two subject images projected onto the light receiving planes of the photoelectric transformation portions $107_a$ and $107_b$ via the field aperture 3, etc.

The shapes of the light intensity distributions of the two images themselves here must be the same. As there is a shape difference between the two images, it becomes an error factor upon estimation of a misalignment between the two images. A significant factor ascribable to such an optical intensity deformation is distortion of the focus detection optical system (an image position-depending magnification error). Basically, distortion occurs symmetrically about the optical axis of the re-imaging lens $106_a$, $106_b$. Generally, the condenser lens 104 and the re-imaging lenses $106_a$, $106_b$ are each made up of a single lens; in FIG. 16, it is difficult to make $\Delta U_a$ the same as $\Delta L_a$ by means of distortion. And the longer the distance between the points U and L, the more likely the difference between $\Delta U_a$ and $\Delta L_a$ is to grow large. In the absence of any fabrication error, $\Delta U_a$ and $\Delta L_b$ would have the same value; however, it is difficult to get rid of the difference between $\Delta U_a$ and $\Delta U_b$ that are compared to obtain phase difference information. In particular, this tends to grow as the power of the re-imaging lens $106_a$, $106_b$ is increased to curtail the total length of the focus detection optical system.

For simplification of explanation, the photoelectric transformation plane of each of the photoelectric transformation portions $107_a$ and $107_b$ is divided into two; in actual applications, however, it is divided into a lot more, and there are other error factors occurring as well by reason of chromatic aberrations and field curvature in addition to distortion. Widening the field aperture 103 may result in a wider range-finding area, but it is difficult to maintain range-finding precision.

Figure 17:
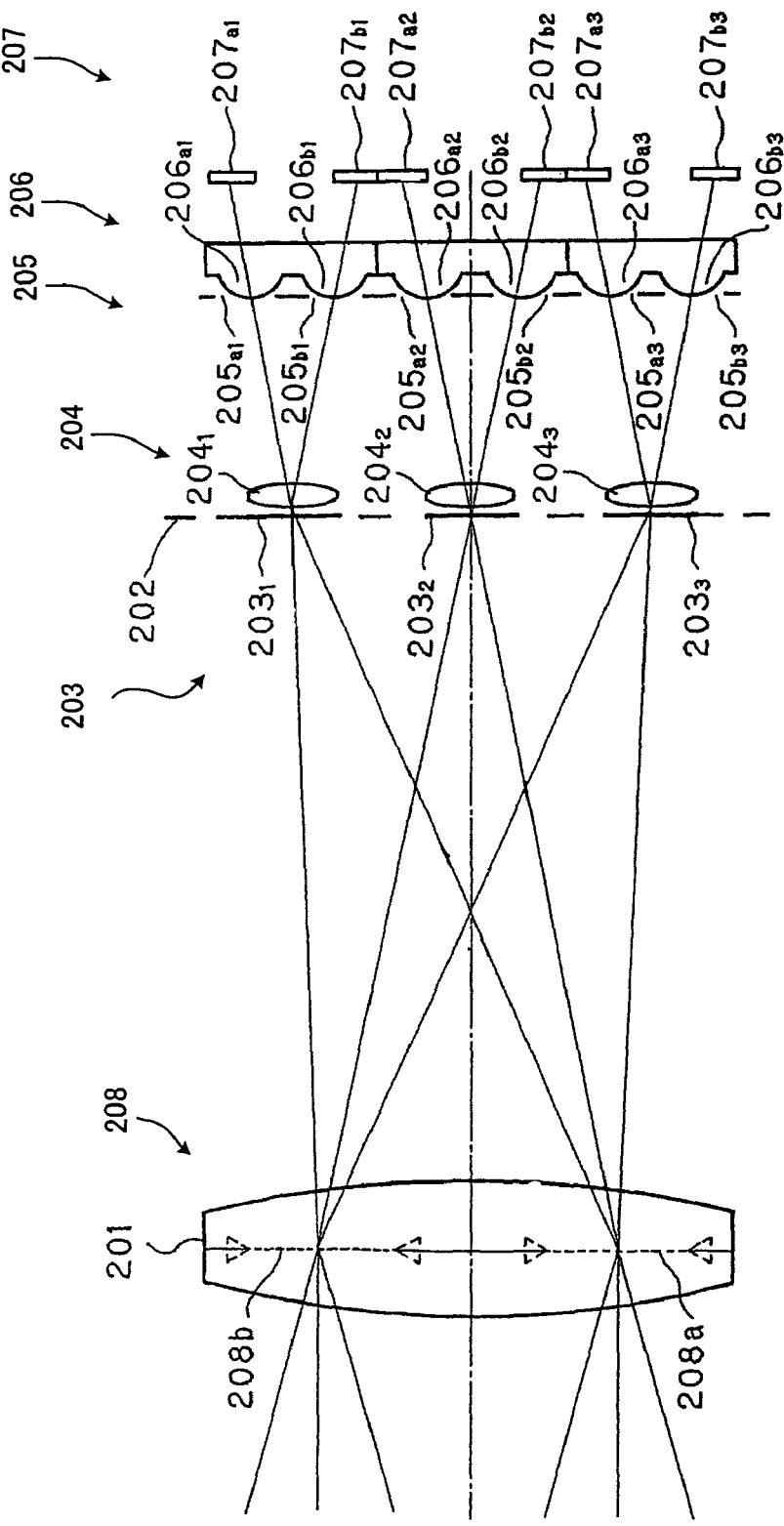
FIG. 17 is illustrative of a comparative example.

FIG. 17 is illustrative of an arrangement wherein, to slim down the focus detection optical system and widen a range-finding field, a field aperture 203 at a focus detection area is divided into sub-apertures, with the focus detection optical system located at each. In FIG. 17, a taking lens 201, virtual areas $208_a$, $208_b$ and predetermined imaging plane 202 similar to those of FIG. 15 are or are supposed to be located, a field aperture 203 divided into $203_1$, $203_2$ and $203_3$ is located near the predetermined imaging plane 202, and pupil division stop apertures $205_{a1}$ to $205_{b3}$ corresponding to the respective field apertures $203_1$, $203_2$ and $203_3$, re-imaging lenses $206_{a1}$ to $206_{b3}$ and a photoelectric transformation portion having photoelectric transformation planes $207_{a1}$ to $207_{b3}$ provided on a light receptor member are located.

And a condenser lens $204_1$ is located near the field aperture $203_1$, the pupil division stop aperture $205_{a1}$ is located at a conjugate position of a virtual area $208_a$ to the condenser lens $204_1$, and the re-imaging lens $206_{a1}$ is located near that pupil division stop aperture $205_{a1}$.

That re-imaging lens $206_{a1}$ projects an image on the field aperture $203_1$ onto the photoelectric transformation plane $207_{a1}$ via the condenser lens $204_1$ and pupil division stop aperture $205_{a1}$.

Provided in similar relations, there are a combination of virtual area $208_b$, field aperture $203_1$, condenser lens $204_1$, pupil division stop aperture $205_{b1}$, re-imaging lens $206_{b1}$ and photoelectric transformation plane $207_{b1}$, a combination of virtual area $208_a$, field aperture $203_2$, condenser lens $204_2$, pupil division stop aperture $205_{a2}$, re-imaging lens $206_{a2}$ and photoelectric transformation plane $207_{a2}$, a combination of virtual area $208_b$, field aperture $203_2$, condenser lens $204_2$, pupil division stop aperture $205_{b2}$, re-imaging lens $206_{b2}$ and photoelectric transformation plane $207_{b2}$, a combination of virtual area $208_a$, field aperture $203_3$, condenser lens $204_3$, pupil division stop aperture $205_{a3}$, re-imaging lens $206_{a3}$ and photoelectric transformation plane $207_{a3}$, and a combination of virtual area $208_b$, field aperture $203_3$, condenser lens $204_3$, pupil division stop aperture $205_{b3}$, re-imaging lens $206_{b3}$ and photoelectric transformation plane $207_{b3}$.

This arrangement may work favorably for slimming-down and making sure range-finding precision, but it is not preferable because the field apertures $203_1$, $203_2$ and $203_3$ are discretely located on the predetermined imaging plane 202.

Figure 18:
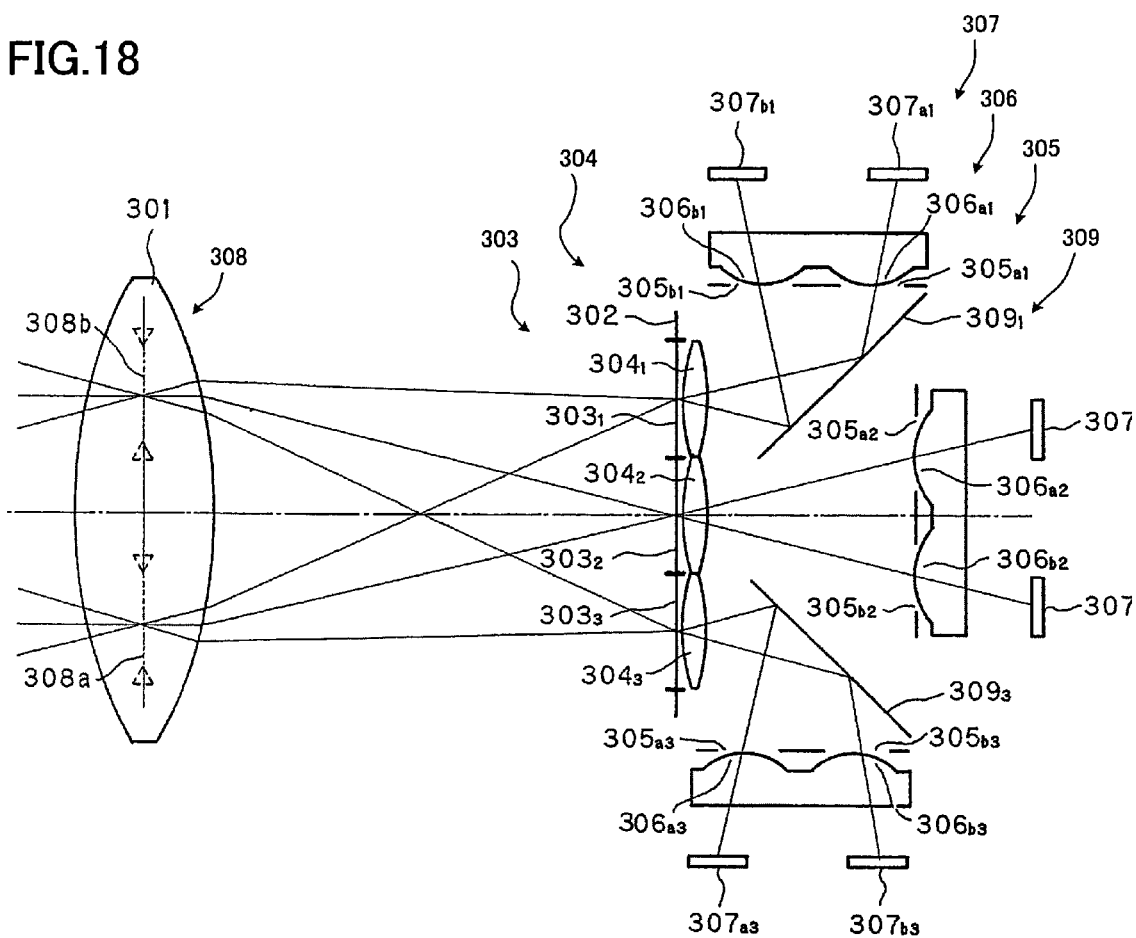
FIG. 18 is illustrative of a comparative example.

FIG. 18 is illustrative of an example of the focus detection optical system wherein by reflection of an optical path corresponding to the outermost of three adjoining field apertures, the discreteness of each field aperture is diminished.

In Comparative Example 2 of FIG. 18, a taking lens 301, virtual areas $308_a$ and $308_b$ and predetermined imaging plane 302 similar to those in Comparative Example 1 of FIG. 17 are, or are supposed to be, located, and a field aperture 303 divided into three focus detection areas $303_1$, $303_2$ and $303_3$ is located near the predetermined imaging plane 302. And are located pupil division stop apertures $305_{a1}$ to $305_{b3}$ corresponding to the respective field apertures $303_1$, $303_2$ and $303_3$, re-imaging lenses $306_{a1}$ to $306_{b3}$, and photoelectric transformation planes $307_{a1}$ to $307_{b3}$ provided on the light receptor member.

And there is a condenser lens $304_1$ located near the field aperture $303_1$, with the pupil division stop aperture $305_{a1}$ located at a conjugate position of the virtual area $308a$ to the condenser lens $304_1$ and the re-imaging lens $306_{a1}$ located near that pupil division stop aperture $305_{a1}$.

The re-imaging lens $306_{a1}$ projects an image on a field aperture $303_a$ onto a photoelectric transformation plane $307_{a1}$ via the pupil division stop aperture $305_{a1}$.

Provided in similar relations, there are a combination of virtual area $308_b$, field aperture $303_1$, condenser lens $304_1$, pupil division stop aperture $305_{b1}$, re-imaging lens $306_{b1}$ and photoelectric transformation surface $307_{b1}$, a combination of virtual area $308_a$, field aperture $303_2$, condenser lens $304_2$, pupil division stop aperture $305_{a2}$, re-imaging lens $306_{a2}$ and photoelectric transformation surface $307_{a2}$, a combination of virtual area $308_b$, field aperture $303_2$, condenser lens $304_2$, pupil division stop aperture $305_{b2}$, re-imaging lens $306_{b2}$ and photoelectric transformation surface $307_{b2}$, a combination of virtual area $308_a$, field aperture $303_3$, condenser lens $304_3$, pupil division stop aperture $305_{a3}$, re-imaging lens $306_{a3}$ and photoelectric transformation surface $307_{a3}$, and a combination of virtual area $308_b$, field aperture $303_3$, condenser lens $304_3$, pupil division stop aperture $305_{b3}$, re-imaging lens $306_{b3}$ and photoelectric transformation surface $307_{b3}$.

On the optical path between the condenser lens $304_1$ and the re-imaging lens $306_{a1}$, $306_{b1}$ there is a reflective member $309_1$ located as shown, and there is a reflective member $309_3$ located between the condenser lens $304_3$ and the re-imaging lens $306_{a3}$, $306_{b3}$ as shown.

Such location of the reflective members makes it possible to overcome the problems of interferences of the photoelectric transformation planes $307_{b1}$ and $307_{a2}$ as well as $307_{b2}$ and $307_{a3}$, whereby the problem of the discreteness of the field aperture 303 can be obviated to some extents.

In this case, however, there must be some space to receive the reflective members for reflecting light beams about the field apertures $303_1$ and $303_3$. To prevent interference of light beams that spread out following the size of the field apertures 303, it is necessary to make sure the field apertures 303 have a space between them. Otherwise, the re-imaging lens 306 can never be flush with the photoelectric transformation plane 307, not only resulting in an increased parts size and an increased parts count but also leading to a drop of assembly precision and an increased cost.

Figure 19:
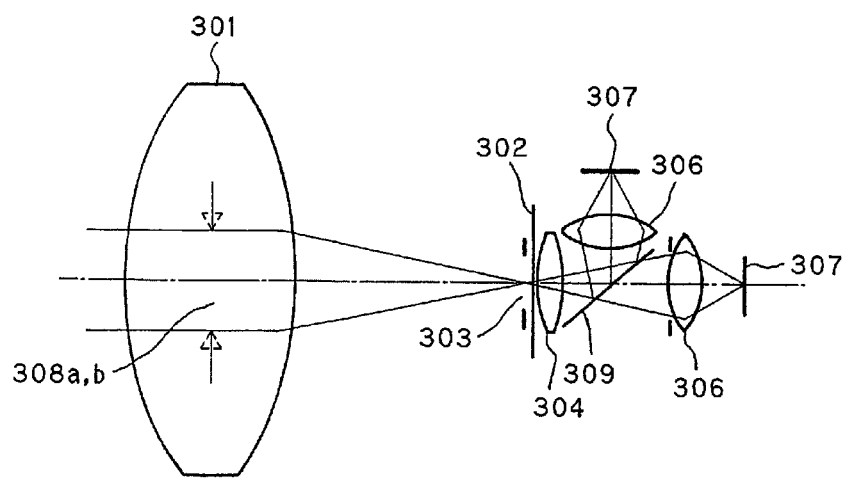
FIG. 19 is illustrative of a comparative example.

FIG. 19 is illustrative in schematic of variants of the direction of bending light by reflective members. Here, a condenser lens group 304, a re-imaging lens group 306, a photoelectric transformation plane 307, etc. are lined up in the direction coming out of the paper.

Even with such a layout, it is needed to have some space to receive reflective members for reflecting light beams. To prevent interferences of light beams that spread out following the size of the field apertures 303, they must have a space between them.

The invention of this application is now explained. FIGS. 1(a), 1(b) and 2(a) are illustrative of the first embodiment of the invention, and a basic arrangement common to other embodiments as well. FIG. 2(b) is illustrative of a comparative example showing one exemplary prior art.

FIG. 1(a) illustrates chief rays passing through the center of each focus detection area and the center of each aperture stop openings. FIG. 1(b) illustrates light rays passing through the upper or lower end of one focus detection area and the upper end, center and lower end of an aperture stop opening adjacent to it.

In FIGS. 1(a) and 1(b), a taking lens 1, virtual areas 8a and 8b and a predetermined imaging plane 2 are, or are supposed to be, located as shown in FIG. 15. And a field aperture is supposed as an opening in the field stop for a focus detection area lined up near the predetermined imaging plane 2 in a row and marked off as $3_1$, $3_2$ and $3_3$. A condenser lens 4, a plurality of pupil division stop apertures 5 that define openings in a pupil division stop, a re-imaging lens group 6 and a photoelectric transformation plane 7 that is an array of light receptor elements provided on a light receptor member 7A, whose optical axes differ corresponding to the respective apertures $3_1$, $3_2$ and $3_3$, are lined up and located in the same direction.

And a condenser lens $4_1$ is located near the field aperture $3_1$. A pupil division stop aperture $5_1$ is located at a conjugate position of a virtual area $8_a$ to the condenser lens $4_1$, and a re-imaging lens $6_1$ is located near it. The re-imaging lens $6_1$ substantially projects an image on a field aperture $3_1$ onto a photoelectric transformation plane $7_{a1}$ through the condenser lens $4_1$ and pupil division stop aperture $5_1$.

A pupil division stop aperture $5_2$ is located at a conjugate position of a virtual area $8_b$ to the condenser lens $4_1$. A re-imaging lens $6_2$ is located near that aperture, and the re-imaging lens $6_2$ substantially projects an image on the field aperture $3_1$ onto a photoelectric transformation surface $7_{b1}$ through the condenser lens $4_1$ and pupil division stop $5_2$.

Likewise, an optical system is set up for other field aperture 3, too. The pupil division stop aperture 5 and the re-imaging lens 6 are common to a pupil division stop aperture 5 and a re-imaging lens 6 in an optical system corresponding to other field aperture 3.

A condenser lens $4_2$ is located near a field aperture $3_2$. A pupil division aperture stop $5_2$ is located at a conjugate position of a virtual area $8_a$ to a condenser lens $4_2$. A re-imaging lens $6_2$ is located near that pupil division stop aperture $5_2$, and it is that re-imaging lens $6_2$ that substantially projects an image on the field aperture $3_2$ onto a photoelectric transformation surface $7_{a1}$ through the condenser lens $4_2$ and pupil division stop aperture $5_2$.

A pupil division stop aperture $5_3$ is located at a conjugate position of a virtual area $8_b$ to a condenser lens $4_2$. A re-imaging lens $6_3$ is located near that pupil division stop aperture $5_3$, and it is the re-imaging lens $6_3$ that substantially projects an image on the field aperture $3_2$ onto a photoelectric transformation surface $7_{b2}$ through the condenser lens $4_2$ and pupil division stop aperture $5_3$.

A condenser lens $4_3$ is located near a field aperture $3_3$. The pupil division stop aperture $5_3$ is located at a conjugate position of the virtual area $8_a$ to the condenser lens $4_3$. The re-imaging lens $6_3$ is located near that pupil division stop aperture $5_3$, and it is the re-imaging lens $6_3$ that substantially projects an image on the field aperture $3_3$ onto a photoelectric transformation surface $7_{a3}$ through the condenser lens $4_3$ and pupil division stop aperture $5_3$.

Further, a pupil division stop aperture $5_4$ is located at a conjugate position of the virtual area $8_b$ to the condenser lens $4_3$. A re-imaging lens $6_4$ is located near that pupil division stop aperture $5_4$, and it is the pupil division stop aperture $5_4$ that substantially projects on an image on the field aperture $3_3$ onto a photoelectric transformation surface $7_4$ through the condenser lens $4_3$ and pupil division stop aperture $5_4$.

Each photoelectric transformation plane 7 is formed on a CCD or CMOS that forms part of it, or a light receptor member, for instance, a member having an array of light receptor elements lined up in a row, thereby holding back fluctuations of sensitivity or other properties of the photoelectric transformation planes 7. Of course, the light receptor elements may be lined up either in a single row or in multiple rows. The light receptor element array may be located at a position other than the position used for focus detection.

A signal of the intensity distribution, obtained from each photoelectric transformation plane 7, is guided to a signal processor S. At the signal processor S, a phase difference across the intensity distribution of each focus detection area $3_1$, $3_2$, $3_3$ due to a light beam upon transmission through each virtual area $8_a$, $8_b$ is detected, and on the basis of the detected phase difference, the signal processor S gives the taking lens 1 an instruction about the amount of movement for focusing.

For instance, when only the focus detection area $3_2$ is spotted for focus detection, a phase difference across an intensity distribution received at photoelectric transformation planes $7_{a2}$ and $7_{b2}$ is detected and depending on the magnitude of that phase difference, how much the taking lens 1 is to be moved is determined. In the example here, if the phase difference across the intensity distribution received at the photoelectric transformation planes $7_{a2}$ and $7_{b2}$ is zero, there is then an in-focus state, as shown in FIG. 1(a).

Where a subject image at the focus detection area $3_2$ is shifted on the taking lens 1 side, the phase at the photoelectric transformation plane $7_{a2}$ has a phase difference shown on the lower side of the drawing with respect to that at the photoelectric transformation plane $7_{b2}$. When there is out of focus in the opposite direction to the taking lens 1 side, the phase at the photoelectric transformation plane $7_{a2}$ has a phase difference shown on the upper side of the drawing with respect to that at the photoelectric transformation plane $7_{b2}$. The same thing happens for other focus detection area 3, too.

It is also possible to implement focus detection using a plurality of focus detection areas 3. For instance, when focus detection is implemented at three focus detection areas $3_1$, $3_2$ and $3_3$, the intensity distributions across the focus detection areas $3_1$, $3_2$ and $3_3$ are detected on the basis of those at the photoelectric transformation planes $7_{a1}$, $7_{a2}$ and $7_{a3}$, and the intensity distributions across the focus detection areas $3_1$, $3_2$ and $3_3$ are detected on the basis of those at the photoelectric transformation planes $7_{b1}$, $7_{b2}$ and $7_{b3}$. And depending on the magnitude of the phase differences of the respective detected intensity distributions, how much the taking lens 1 is to be moved is determined. Focus detection may also be implemented using any two focus detection areas 3 selected out of three.

As shown in FIGS. 1(a) and 1(b), the pupil division stop aperture $5_2$ and re-imaging lens $6_2$ are commonly corresponding to the field apertures $3_1$ and $3_2$. However, the corresponding virtual area 8 differs at the respective field apertures 3: the field apertures $3_1$ and $3_2$ correspond to the virtual areas $8_b$ and $8_a$, respectively.

Similarly, the pupil division stop aperture $5_3$ and re-imaging lens $6_3$ correspond commonly to the field apertures $3_2$ and $3_3$. As in FIGS. 17 and 18 referred to as comparative examples, there are three field apertures 3 as in FIG. 18, but there are four re-imaging lenses (six in Comparative Examples 1 and 2).

Thus, no care should be taken of the overlaps of light beams from the respective field apertures 3 to the re-imaging lenses 6; it is possible to reduce the discreteness of the locations of the field apertures 3 to some considerable extents. It is also possible to diminish the angle of light on the re-imaging lenses 6; this works favorably for aberrations, and facilitates slimming down the optical system in consideration of a widening field of view as well. Further, it is possible to make the photoelectric transformation planes 7 flush with one another so that parts costs and assembling costs are easily cut short. Reduced discreteness also ensures that the outputs of $7_{a1}$, $7_{a2}$ and $7_{a3}$ and the outputs of $7_{b1}$, $7_{b2}$ and $7_{b3}$ are easily handleable as a successive output, helping make the range-finding areas wider and the measurable quantity of defocus much more.

FIGS. 2(a) and 2(b) are illustrative of the comparison of the embodiment of the invention with a conventional type: FIG. 2(a) is one of the embodiments of the invention shown in FIGS. 1(a) and 1(b), and FIG. 2(b) is a general prior example similar to that shown in FIG. 15.

It is found that the powers of condenser lenses 4 and re-imaging lenses 6 can reasonably be increased, although there are field apertures 3 provided which are of much the same size as heretofore but have extremely reduced discreteness so that slimming-down is achievable. It is unlikely that the field apertures 203 become discrete as shown in FIG. 16, and it is not necessary to make sure some space for the reflective members 309, either, as shown in FIG. 17. With FIG. 17, there are constraints under which optical paths leaving the field apertures cannot overlap: discreteness tends to grow substantially strong. In the embodiment here, however, it is found that this is overcome, too.

Figure 3:
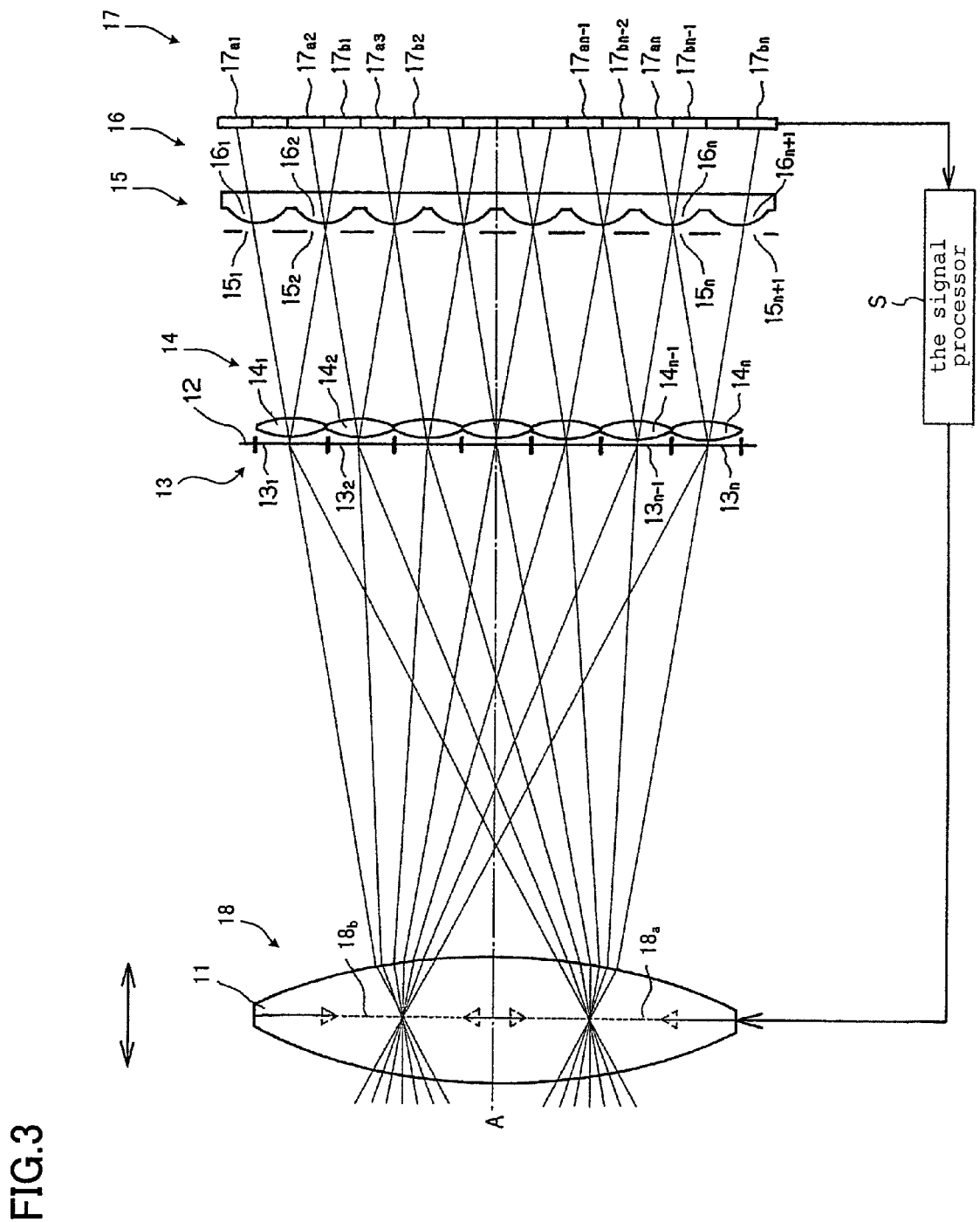
FIG. 3 is illustrative of a modification to the first embodiment wherein the field of view is extended.

FIG. 3 is illustrative of an embodiment wherein more field apertures than used in each of the aforesaid embodiments are provided in a specific direction so that the field of view is extended. In the embodiment shown in FIGS. 1(a) and 1(b), there are three field apertures in one direction; in the embodiment here, however, there are four or more lined up in a row.

This embodiment is now explained on the basis of the optical axis of a taking lens 11. The taking lens here is supposed to have a linear optical axis although, in actual applications, that optical path is often bent by a mirror or the like. The same will apply to other embodiments.

Referring to FIG. 3, the taking lens 11, virtual areas $18_a$, $18_b$ and a predetermined imaging plane 12 are, or are supposed to be, located. Near the predetermined imaging plane 12 there are field apertures $13_1, 13_2, 13_3, \ldots, 13_{n-1}$ and $13_n$ lined up, which are openings in n field stops for focal detection areas. About the optical axis, the field apertures 13 are lined up in the same direction as the virtual areas $18a$ and $18b$ are lined up. The field apertures 13, each of the same size, are located equidistantly in an adjoining relation. This enables the focus detection system to be set up in order, working favorably for cost reductions.

In the optical axis direction of, and near, the field apertures $13_1, 13_2, 13_3, \ldots, 13_{n-1}$ and $13_n$, condenser lenses $14_1, 14_2, 14_3, \ldots, 14_{n-1}$ and $14_n$ having varying optical axes are located corresponding to them.

On a plane vertical to the optical axis and spaced away from the predetermined imaging plane 12 at a given distance in the opposite direction to the taking lens 11, there are pupil division stop apertures $15_1, 15_2, 15_3, \ldots, 15_{n-1}, 15_n$ and $15_{n+1}$ located, defining openings in (n+1) pupil division stops. The pupil division stop apertures 15, each of the same size, are lined up at equal space.

It is desired that a field aperture $13_i$ lies between pupil division stop apertures $15_i$ and $15_{i+1}$, as viewed through in the optical axis direction, where i is 1 to n. This facilitates diminishing the angle of light rays incident on the respective pupil division stop apertures 15, working favorably for size reductions and aberration reductions.

Except the condenser lenses $14_1$ and $14_n$, the condenser lens $14_i$ is set up such that the virtual area $18_a$ is in conjugate relation to the pupil division stop aperture $15_i$ and the virtual area $18_b$ is in conjugate relation to the pupil division stop aperture $15_{i+1}$. The condenser lens $14_1$ is set up such that the virtual area $18_a$ is in conjugate relation to the pupil division stop aperture $15_1$, and the condenser lens $14_n$ is set up such that the virtual area $18_b$ is in conjugate relation to the pupil division stop aperture $15_{n+1}$.

To put this to practice, it is desired that the respective condenser lenses have equal power, and the center positions of the respective apertures corresponding to the optical axes of the respective condenser lenses differ little by little.

A re-imaging lens group 16 comprising a plurality of re-imaging lenses $16_i$ is located near positions where the respective pupil division stop apertures $15_i$ (i is 1 to n+1) are offset in the optical axis direction.

The re-imaging lens group 16 is going to define a two-dimensional imaging plane on a plane almost conjugate to the surface of each field aperture 13, and on that imaging plane there is an array of light receptor elements located, which is the photoelectric transformation plane 17 of a light receptor member 17A.

A re-imaging lens $16_i$ (where i is 1 to n) projects an image on the field aperture $13_i$ onto a photoelectric transformation plane $17_{ai}$ on the secondary imaging plane of the light receptor member through the condenser lens $14_i$ and pupil division stop aperture $15_i$, and a re-imaging lens $16_i$ (where i is 2 to n+1) projects an image on a field aperture $13_{i-1}$ onto a photoelectric transformation surface $17_{bi}$ on the secondary imaging plane through a condenser lens $14_{i-1}$ and a pupil division stop aperture $15_i$.

On the secondary imaging plane there are the photoelectric transformation planes 17 lined up in order of $17_{a1}, 17_{a2}, 17_{b1}, 17_{a3}, 17_{b2}, \ldots, 17_{ai}, 17_{b(i-1)}, 17_{a(i+1)}, 17_{bi}, 17_{a(i+2)}, 17_{b(i+1)}, \ldots, 17_{an}, 17b(n-1)$ and $17_{bn}$, and other than between $17_{a1}$ and $17_{a2}$ and $17_{b(n-1)}$ and $17_{bn}$, the photoelectric transformation planes 17 of the same length are lined up at equal space. The photoelectric transformation planes 17 here refer to an effective area from which phase difference information is amassed; they may be set up as an integral unit in practical fabrication processes.

With the invention, slimming-down and a wide range-finding field of view are achievable. To narrow the space between a condenser lens group 14 and a pupil division stop aperture group 15, it is required to make the powers of the condenser lenses 14 stronger; however, the individual apertures can be diminished and so can the diameters of the condenser lenses 14. As a result, the powers of the condenser lenses 14 can easily be boosted up. Likewise, it is also possible to boost up the powers of the re-imaging lenses 16.

The field apertures 13 are intimately lined up so that the discreteness of the whole field of view is diminished; if the individual field apertures 13 are diminished, they can then be assembled so that they can be handled as one single field aperture 13. Overall, they can be handled as a large field aperture 13 for focus detection. In this case, it is also possible to increase the quantity of defocus capable of detecting focus.

In the embodiment here, a field frame is interposed between the respective field apertures 13 to prevent crosstalk, etc.

Figure 4:
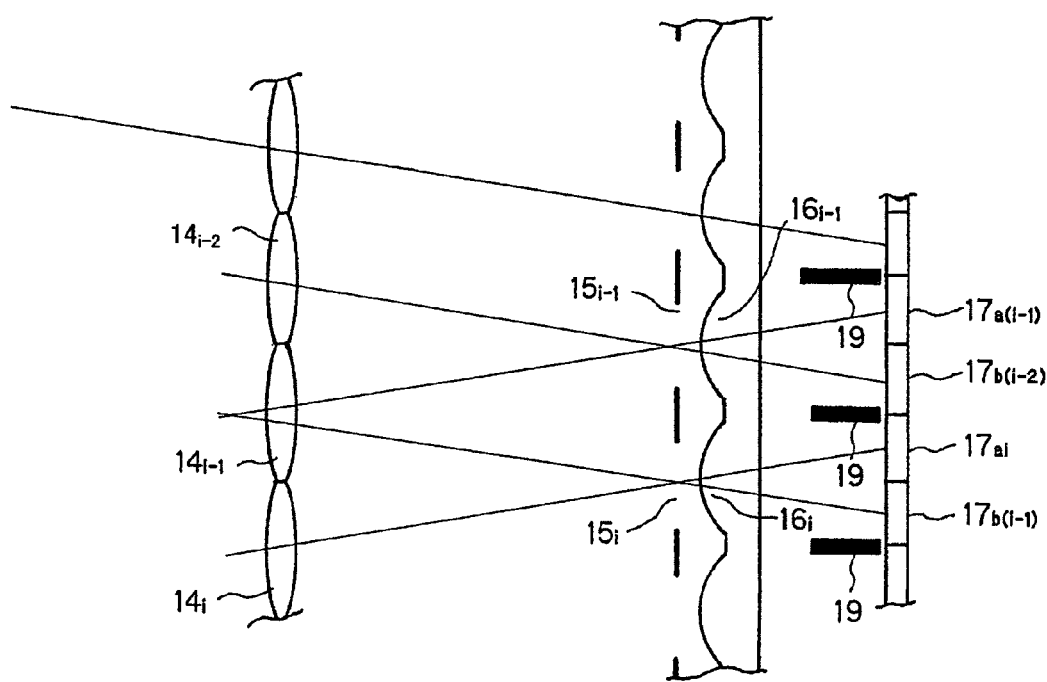
FIG. 4 is illustrative of an embodiment of the invention wherein light block walls are located.

In addition to, or instead of, this, a light block wall 19 may be interposed between the re-imaging lens 16 and the photoelectric transformation plane 17, as shown in FIG. 4. To be particularly effective, the light block wall 19 is located such that there is a separation between the photoelectric transformation planes $17_{b(i-2)}$ and $17_{ai}$. In short, by providing the light block wall 19 between images formed by the re-imaging lenses 16 in re-imaging lens unit, a light beam from a certain re-imaging lens 16 can be blocked off while making sure the quantity of light from adjacent re-imaging lenses 16.

It is noted that when the photoelectric transformation planes 17 are located at equal space, the second photoelectric transformation planes as counted from both ends are not available.

Figure 5:
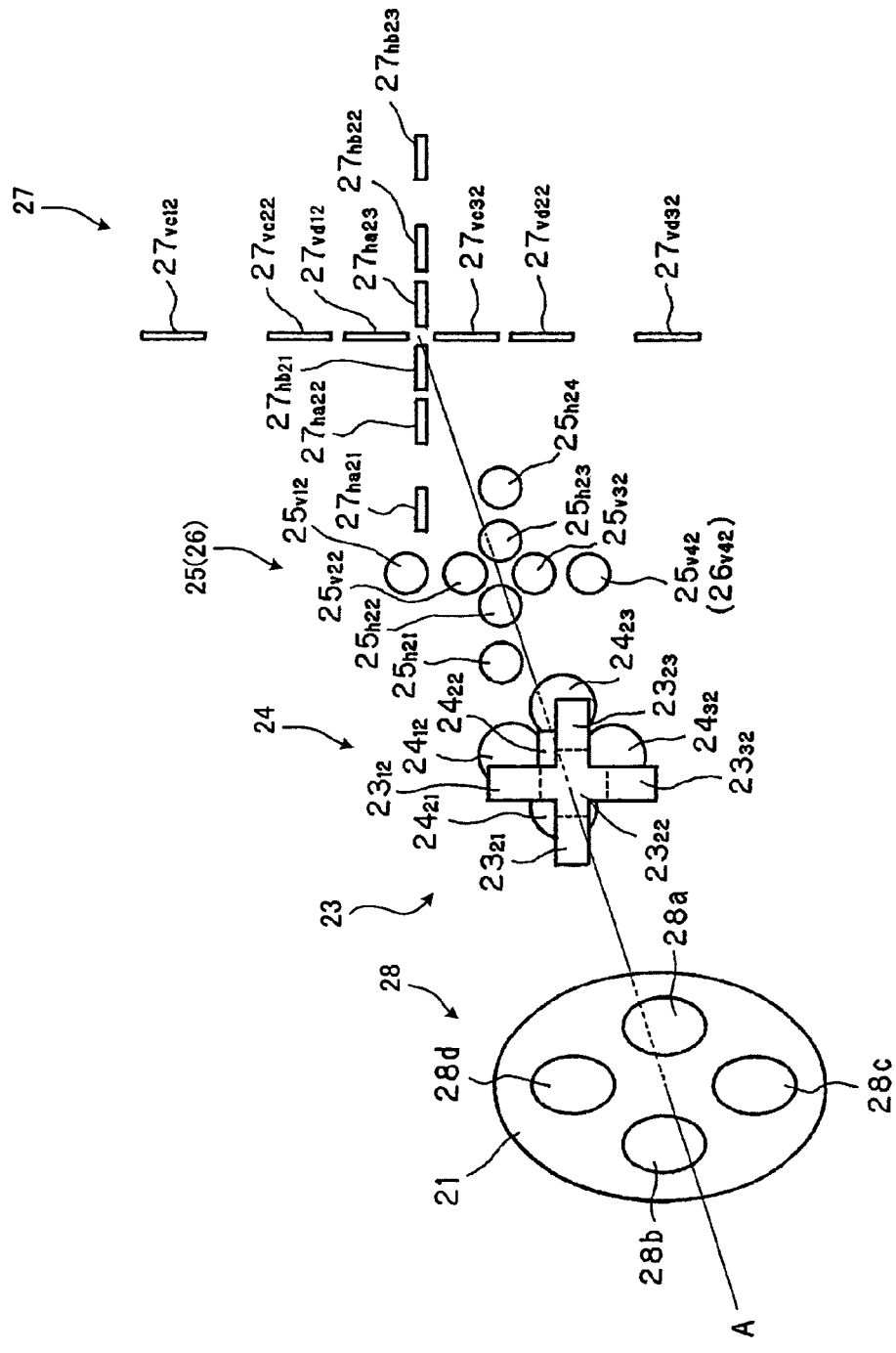
FIG. 5 is illustrative of the second embodiment of the invention of this application.

FIG. 5 is illustrative of the second embodiment wherein the embodiment of FIG. 1 is modified such that the range-finding area is extended crosswise in two directions so that phase difference information for implementing focus detection is also used in two directions. The layout for the center re-imaging lens 6 has the merit of easily extending the range-finding area crosswise.

In the embodiment shown in FIG. 5, a taking lens 21, and two sets of virtual areas (a pair of 28a and 28b, and a pair of 28c and 28d) are supposed to be provided. One set is supposed to comprise 28a and 28b and another 28c and 28d.

One set of virtual areas and another set of virtual areas are arranged in different directions (with 28a and 28b in the horizontal and 28c and 28d in the vertical). Field apertures $23_{21}$, $23_{22}$, $23_{23}$, $23_{12}$ and $23_{32}$ that define openings in five field stops for focus detection areas are supposed to be located near a predetermined imaging plane 22 (not shown) equivalent to an imaging plane. Each field aperture 23 corresponds to each focus detection area, and two focus detection areas, vertical and horizontal, intersect at the center field aperture $23_{22}$.

The field apertures $23_{21}$, $23_{22}$ and $23_{23}$ are lined up straight along (here in the horizontal) in this order with the field aperture $23_{22}$ as center, and the field apertures $23_{12}$, $23_{22}$ and $23_{32}$ are lined up straight along (in the direction vertical to the direction that the field apertures $23_{21}$, $23_{22}$ and $23_{23}$ are lined up) with the field aperture $23_{22}$ as center.

Here, the direction that the virtual areas 28a and 28b are lined up and the direction that the field apertures $23_{21}$, $23_{22}$ and $23_{23}$ are lined up are the same with the optical axis of the taking lens 21 as center, and the direction that the virtual areas 28c and 28d are lined up and the direction that the field apertures $23_{12}$, $23_{22}$ and $23_{32}$ are lined up are the same with the optical axis of the taking lens 21 as center.

Near the field aperture $23_{21}$ there is a condenser lens $24_{21}$ located. Likewise, near the field apertures $23_{22}$, $23_{23}$, $23_{12}$ and $23_{32}$, there are condenser lenses $24_{22}$, $24_{23}$, $24_{12}$ and $24_{32}$ located, respectively, which have different optical axes.

At a conjugate position of the virtual area 28a to the condenser lens $24_{22}$, there is a pupil division stop aperture $25_{h22}$ located that is an opening in the pupil division stop. Likewise, at conjugate positions of the virtual areas 28b, 28c and 28d to the condenser lens $24_{22}$, there are pupil division apertures $25_{h23}$, $25_{v22}$ and $25_{v32}$ located, corresponding to the respective virtual areas. Further, at conjugate position of the virtual areas 28a and 28b to the condenser lens $24_{21}$, there are pupil division stop apertures $25_{h21}$ (corresponding to the virtual area 28a) and $25_{h22}$ (corresponding to the virtual area 28b) located.

The virtual areas are to other condenser lenses $24_{23}$, $24_{12}$ and $24_{32}$ what they are to the aforesaid condenser lens $24_{21}$, provided that they are rotated and moved about the optical axis of the taking lens 21.

That is to say, at conjugate positions of the virtual areas 28a and 28b to the condenser lens $24_{23}$ there are pupil division stop apertures $25_{h23}$ and $25_{h24}$ located, and at conjugate positions of the virtual areas 28c and 28d to the condenser lens $24_{12}$ there are pupil division stop apertures $25_{v12}$ and $25_{v22}$ located. Further at conjugate positions of the virtual areas 28c and 28d to the condenser lens $24_{32}$, there are pupil division stop apertures $25_{v32}$ and $25_{v42}$ located.

Near the pupil division stop apertures $25_{h21}$, $25_{h22}$, $25_{h23}$, $25_{h24}$, $25_{v22}$, $25_{v32}$ and $25_{v42}$ there are re-imaging lenses $26_{h21}$, $26_{h22}$, $26_{h23}$, $26_{h24}$, $26_{v12}$, $26_{v22}$, $26_{v32}$ and $26_{v42}$ located, respectively. Although a re-imaging lens group 26 is not shown for simplification in FIG. 5, it should be understood that each pupil division stop aperture 25 is located integral with each re-imaging lens 26.

The function of the re-imaging lens in the horizontal direction is now explained.

The re-imaging lens $26_{h21}$ is operable to project an image on the field aperture $23_{21}$ onto a photoelectric transformation plane $27_{ha21}$ through the condenser lens $24_{21}$ and pupil division stop aperture $25_{h21}$.

The re-imaging lens $26_{h22}$ is operable to project an image on the field aperture $23_{21}$ onto a photoelectric transformation plane $27_{hb21}$ through the condenser lens $24_{21}$ and pupil division stop aperture $25_{h22}$, and project an image on the field aperture $23_{22}$ onto a photoelectric transformation plane $27_{ha22}$ through the condenser lens $24_{22}$ and pupil division stop aperture $25_{ha22}$.

The re-imaging lens $26_{h22}$ is operable to project an image on the field aperture $23_{22}$ onto a photoelectric transformation plane $27_{hb22}$ through the condenser lens $24_{22}$ and pupil division stop aperture $25_{h22}$, and project an image on the field aperture $23_{22}$ onto a photoelectric transformation plane $27_{ha23}$ through the condenser lens $24_{23}$ and pupil division stop aperture $25_{h23}$.

The re-imaging lens $26h24$ is operable to project an image on the field aperture $23_{23}$ onto a photoelectric transformation plane $27_{hb23}$ through the condenser lens $24_{23}$ and pupil division stop aperture $25_{h24}$.

The function of the re-imaging lens in the vertical direction is now explained.

The re-imaging lens $26_{v12}$ is operable to project an image on the field aperture $23_{12}$ onto a photoelectric transformation plane $27_{vc12}$ through the condenser lens $24_{12}$ and pupil division stop aperture $25_{v12}$.

The re-imaging lens $26_{v22}$ is operable to project an image on the field aperture $23_{12}$ onto a photoelectric transformation plane $27_{vd12}$ through the condenser lens $24_{12}$ and pupil division stop aperture $25_{v22}$, and project an image on the field aperture $23_{22}$ onto a photoelectric transformation plane $27_{vc22}$ through the condenser lens $24_{22}$ and pupil division stop aperture $25_{v22}$.

The re-imaging lens $26_{v32}$ is operable to project an image on the field aperture $23_{32}$ onto a photoelectric transformation plane $27_{vd22}$ through the condenser lens $24_{22}$ and pupil division stop aperture $25_{v32}$, and project an image on the field aperture $23_{32}$ onto a photoelectric transformation plane $27_{vc32}$ through the condenser lens $24_{32}$ and pupil division stop aperture $25_{v32}$.

The re-imaging lens $26_{v42}$ is operable to project an image on the field aperture $23_{32}$ onto a photoelectric transformation plane $27_{vd32}$ through the condenser lens $24_{32}$ and pupil division stop aperture $25_{v42}$.

The respective photoelectric transformation planes on the light receptor member 27A are located substantially at conjugate planes to the respective field aperture planes 23. Light receptor elements on the photoelectric transformation plane 27 are lined up in a row, horizontal and vertical, so as to produce a phase difference for focus detection. Instead of each light receptor element array, there may be a single area sensor used, which comprises a light receptor element array. Parallel holds for other embodiments, too.

Thus, the embodiment here may be applied to a focus detection optical system having the so-called crosswise range-finding field of view.

Figure 6:
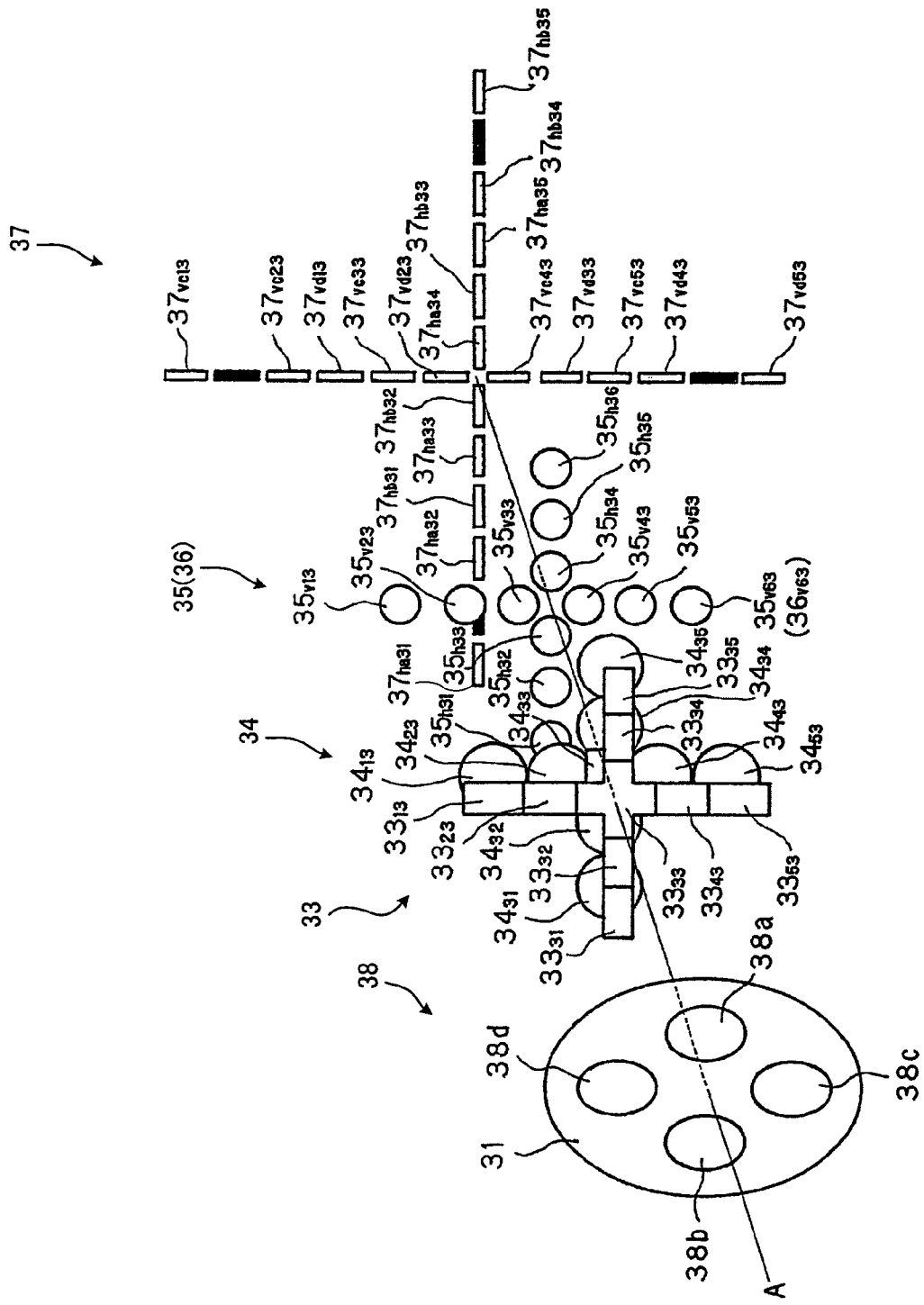
FIG. 6 is illustrative of a modification to the second embodiment wherein the field of view is extended.

In an embodiment shown in FIG. 6, the crosswise focus detection field such as the one according to the embodiment of FIG. 5 is so extended that there can be the field of view broadened crossways. In the embodiment here, with the optical axis of a taking lens 32 as center, there are five field apertures 33 provided vertically, each defining an opening in a field stop in each focus detection area, and five provided horizontally, while the center apertures $33_{33}$ intersect. As shown, there are a total of nine field apertures 33, with the center field apertures $33_{33}$ capable of detecting phase differences vertically and horizontally, enhancing focus detection precision.

Corresponding to the respective focus detection areas, there are condenser lenses 34 located, which have different optical axes. Each condenser lens 34 is operable to guide a light beam toward a pair of adjoining re-imaging lenses 36 located in correspondence to each field aperture 33.

A re-imaging lens group 36 comprises vertically lined-up six re-imaging lenses 36 and horizontally lined-up six re-imaging lenses 36, which are located symmetrically about the optical axis of the taking lens 31. The re-imaging lenses except the outermost four are operable to guide a light beam incident from two adjoining field apertures 33 toward the subsequent light receptor element array.

Virtual areas 38a, 38b, 38c and 38d of the taking lens 31, field apertures 33, condenser lenses 34, pupil division stop apertures 35, re-imaging lenses 36 and light receptor arrays are located in both vertical and horizontal relations as explained in conjunction with FIG. 3.

The advantages of this embodiment: wider focus detection areas, smaller focus detection optical systems, and more increased defocus quantity capable of focus detection would be undisputed from the explanations of the already explained embodiments, and so any further details would be omitted.

Figure 7:
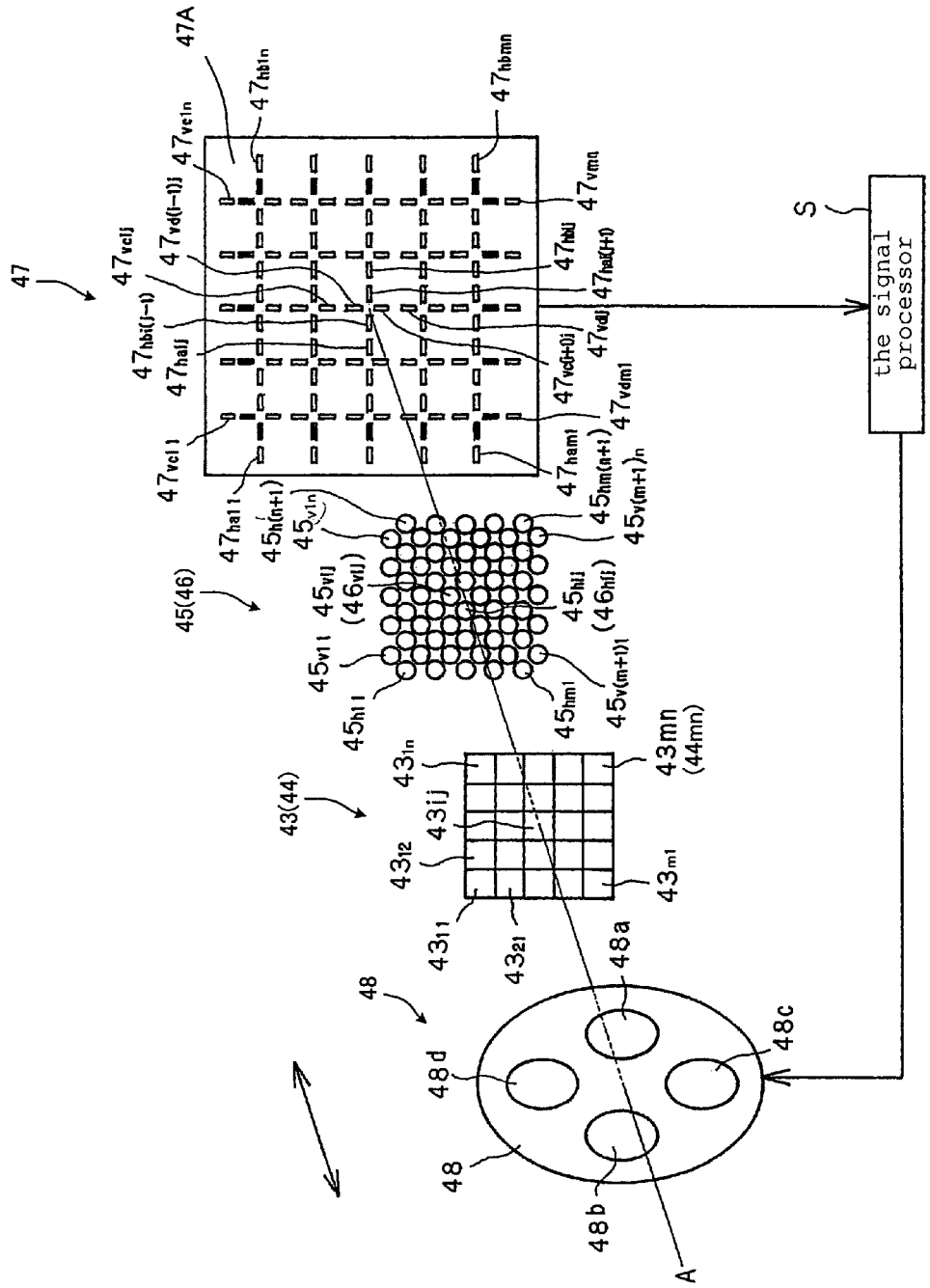
FIG. 7 is illustrative of the third embodiment of the invention of this application.

FIG. 7 is illustrative of the third embodiment of the invention wherein such focus detection systems as shown in FIG. 3 are arranged in rows and columns. In FIG. 7, field apertures 43 that are openings in the field stops in a focus detection area, re-imaging lenses 46 and an array of light receptor elements 47 are schematically depicted.

Briefly, there are such virtual areas 48a, 48b, 48c and 48d as in FIG. 6 provided, and there are field apertures $43_{ij}$ arrayed on m matrices in the direction that the virtual areas 48a and 48b are lined up and n matrices in the direction that the virtual areas 48c and 48d are lined up (1<i<m, 1<j<n). Near and corresponding to the respective field apertures 43, there are condenser lens $44_{ij}$ (1<i<m, 1<j<n) located. In FIG. 7, note that the condenser lenses are shown as being integral with the field apertures 43.

It is here noted that m and n will increase at an increment of 1 in the lined-up direction. Each field aperture 43 is just about the detection of a phase difference in the vertical and horizontal directions, and for this, use may be made of an crosswise aperture wherein long focus detection areas in the vertical and horizontal directions are put one upon another, or a square, rectangular or other aperture capable of covering a quantity detection area.

A pupil division stop aperture 45 that is an opening in a pupil division step is located on a conjugate plane of the virtual area to each condenser lens 44. The pupil division stop aperture 45 comprises, in order to obtain phase difference information in the horizontal direction, a pupil division stop aperture $45_{hij}$ (1<i<m+11, 1<j<n) wherein pupil division apertures comprising m+1 openings in the horizontal direction are located parallel in n rows in the vertical direction and, in order to obtain phase difference information in the vertical direction, a pupil division stop aperture $45_{vij}$ (1<i<m, 1<j<n+1) wherein pupil division apertures comprising n+1 openings in the vertical direction are located parallel in m rows in the horizontal direction.

This arrangement is such that a condenser lens $44_{ij}$ lets the virtual areas 48a, 48b, 48c and 48d have conjugate relations to the pupil division stop apertures $45_{hij}$, $45_{h(i+1)j}$, $45_{vij}$ and $45_{vi(j+1)}$.

And corresponding re-imaging lenses $46_{hij}$ (1<i<m+1, 1<j<n) and $46_{hij}$ (1<i<m, 1<j<n+1) (shown as being integral with the pupil division stop apertures 45) are located proximately to the respective pupil division stop apertures 45.

Suppose here that the secondary imaging plane is defined by an almost conjugate plane to each field aperture $43_{ij}$. Disposed on that plane are photoelectric transformation planes $47_{ahij}$ (1<i<m, 1<j<n), $47_{bhij}$ (i<i<m, 1<j<n), $47_{cvij}$ (1<i<m, 1<j<n) and $47_{dvij}$ (1<i<m, 1<j<n), and an image on the field aperture $43_{ij}$ is again formed on each photoelectric transformation plane 47 by way of the re-imaging lenses $46_{hij}$ and $46_{vij}$.

The photoelectric transformation planes $47_{ahij}$ (1<i<m, 1<j<n) and $47_{bhij}$ (i<i<m, 1<j<n) for the detection of a phase difference in the horizontal direction are alternately arranged in the same row as shown in FIG. 3, except both ends, and the photoelectric transformation planes $47_{cvij}$ (1<i<m, 1<j<n) and $47_{dvij}$ (i<i<m, 1<j<n) for the detection of a phase difference in the vertical direction are alternately arranged in the same row as shown in FIG. 3, except both ends, A light beam passing through the virtual area 48a is guided onto the photoelectric transformation plane $47_{ahij}$ located on the re-imaging plane through the field aperture $43_{ij}$, condenser lens $44_{ij}$, pupil division stop aperture $45_{hij}$ and re-imaging lens $46_{hij}$ so that an image near the field aperture $43_{ij}$ is again formed.

A light beam passing through the virtual area 48b is guided onto the photoelectric transformation plane $47_{bhij}$ located on the re-imaging plane through the field aperture $43_{ij}$, condenser lens $44_{ij}$, pupil division stop aperture $45_{hi(j+1)}$ and re-imaging lens $46_{hi(j+1)}$ so that an image near the field aperture $43_{ij}$ is again formed.

Likewise, a light beam passing through the virtual area 48c is guided onto the photoelectric transformation plane $47_{cvij}$ located on the re-imaging plane through the field aperture $43_{ij}$, condenser lens $44_{ij}$, pupil division stop aperture $45_{vij}$ and re-imaging lens $46_{vij}$ so that an image near the field aperture $43_{ij}$ is again formed, and a light beam passing through the virtual area 48d is guided onto the photoelectric transformation plane $47_{dvij}$ located on the re-imaging plane through the field aperture $43_{ij}$, condenser lens $44_{ij}$, pupil division stop aperture $45_{v(i+1)j}$ and re-imaging lens $46_{v(i+1)j}$ so that an image near the field aperture $43_{ij}$ is again formed.

According to the embodiment here making use of the invention of this application, it is thus possible to set up a large range-finding area with a slimmed-down focus detection system adapted to amass phase difference information in two directions. It is also possible to make fragmentation of the field aperture while discreteness is kept small, thereby setting up a focus detection system of high precision. Note here that to get around crosstalk or other inconvenience, a field frame may be formed on the field aperture or a light block wall 49 (not shown) may be interposed between the re-imaging lens and the photoelectric transformation plane.

Preferably, the magnification of the re-imaging system of the invention is set at ½ or below in the event that focus detection is implemented using unidirectional phase difference information as shown in FIG. 3 or at ⅓ or below in the event that focus detection is implemented using bidirectional phase difference information as shown in FIGS. 5 and 6, because the photoelectric transformation plane can efficiently be set up.

Figure 8:
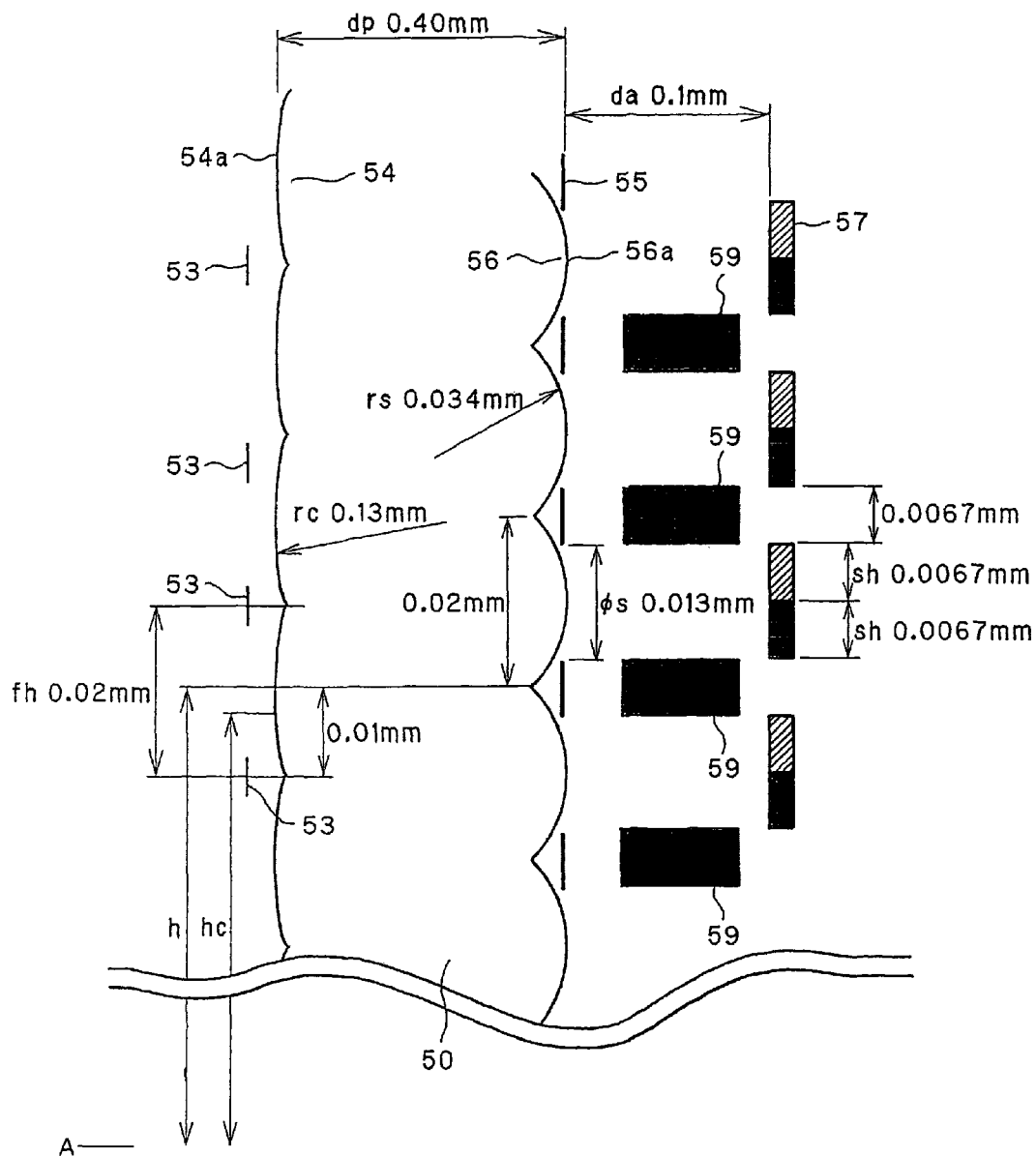
FIG. 8 is illustrative of a numerical example of the invention.

A numerical example is now explained with reference to FIG. 8. Typically, an account is given of such a two-dimensional extent as shown in FIG. 7. For the purpose of explanation, reference is made to a part of the section in one h direction as shown in FIG. 8. In this numerical example, a virtual area is set at −100 mm from the predetermined imaging plane, and the central spacing (pitch) of a field aperture 53 defined by openings in adjoining field stops of a focus detection area is 0.02 mm in the (horizontal) h direction (fh) and 0.02 mm in the (vertical) v direction (fv), with an optical medium filling in between a condenser lens 54 and a re-imaging lens 56.

In other words, a condenser lens array 54a (plane) is provided on the taking lens side of a plate 50, and a re-imaging lens array 56a is provided on the side of a photoelectric transformation plane 57.

The plate 50 here is formed of resin, and suppose that the refractive index of the medium is 1.5, the radius of curvature rc of the surface of the condenser lens 54 is 0.13 mm, the radius of curvature r of the re-imaging lens 56 (surface) is 0.034 mm, the thickness dp of the plate is 0.4 mm, a pupil division stop aperture 55 is integral with the re-imaging lens 56 (surface) and configured as a circle having a diameter $\phi s$ of 0.013 mm, the spacing da between the re-imaging lens surface 56 and the photo-electric transformation plane 57 is 0.1 mm, and the magnification of the focal detection system is about ⅓.

The spacing (pitch) of the re-imaging lenses lined up in the h and v directions, too, is about 0.02 mm as is the case with the condenser lens 54. Suppose here that the condenser lens 54 has a focal length of 0.27 mm and the re-imaging lens 56 has a focal length of 0.09 mm. If h is a distance from the center of the field aperture 54 up to the optical axis 51 of the taking lens, then a distance hc from the condenser lens 54 up to the optical axis 51 is 0.9973×h. It is here understood that there is a midway point set between the adjoining re-imaging lenses 56 at a position of extending from the center of the field aperture 53 toward the optical axis 51. The light reception range of each photoelectric transformation portion 57 is then given by sh (horizontal)×sv (vertical)=0.0067 mm×0.0067 mm.

Further, a light block wall 50 may as well be located between the midway position between the adjoining re-imaging lenses 56 and the photoelectric transformation plane 57 used. Here, if the focus detection optical system has a magnification of ⅓, between the center of the midway position between adjoining re-imaging lenses 56 and the photoelectric transformation plane 57 there is then a space left through which none of normal light beams (used for focus detection) pass. In the example here, the light block wall 59 is located within an area of 0.0067 mm×0.0067 mm about the midway position between adjoining re-imaging lenses 56.

A field frame 53a is located at the field aperture 53. With this light block wall 59 or the filed frame 53a, crosstalk at the photoelectric transformation plane 57, to which one re-imaging lens 56 corresponds, can efficiently be kept in check.

Figure 9:
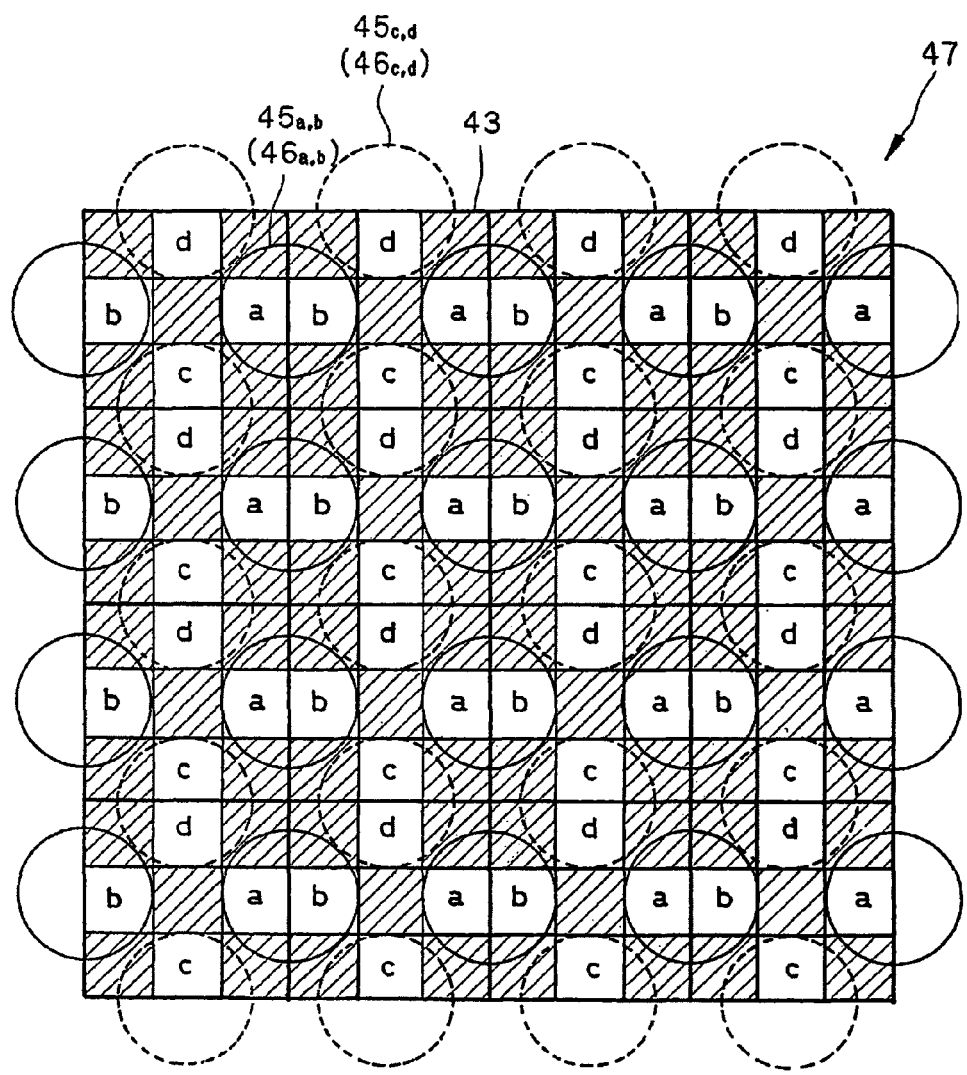
FIG. 9 is a layout view of the photoelectric transformation member as viewed from the optical axis direction.

FIG. 9 is illustrative of a layout of the photo-electric transformation member 47 as viewed from the optical axis direction: FIG. 9 illustrates a part of the layout of the integral photoelectric transformation member 47 on an enlarged scale. The photoelectric transformation member 47 comprises light receptor element arrays arranged vertically and horizontally in a matrix fashion.

In FIG. 9, the inside of a hatched rectangle is a portion that is not used for focus detection, and rectangles indicated at a, b, c and d are the ranges of photoelectric transformation portions corresponding to the virtual areas 48a, 48b, 48c and 48d in FIG. 7.

A rectangular range surrounded by a thick line is a range of the field aperture 43 projected in the optical axis direction. It is found that the rectangular range surrounded by the thick line is triple as large as the range of the photoelectric transformation means 47, both vertically and horizontally.

What is encircled refers to an effective range of a pupil division stop aperture 45 projected in the optical axis direction and a re-imaging lens 46 located near it. A solid-line circle corresponds to a pupil division stop aperture 45 and a re-imaging lens 47 for detecting phase information in the horizontal direction, corresponding to the virtual areas 48a and 48b in FIG. 7, and a dotted-line circle corresponds to a pupil division stop aperture 45 for detecting phase information in the vertical direction, corresponding to the virtual areas 48c and 48d in FIG. 7.

FIG. 10 is illustrative of another embodiment of the invention of this application: FIG. 10(a) is a perspective view of another embodiment, and FIG. 10(b) is a front view of another embodiment.

For a better understanding of construction, a re-imaging lens group 66 and a light receptor element array 67 are exaggerated in terms of spacing and size. However, viable distances and sizes should be determined in such a way as to satisfy imaging capabilities as shown in FIGS. 1(a) and 1(b).

Here, there are a taking lens 61 and two sets of virtual areas (a pair of 68a and 68b and a pair of 68c and 68d) supposed. One set is going to be the virtual areas 68a and 68b, and another the virtual areas 68c and 68d. In the respective sets, the virtual areas are lined up in different directions. Field apertures $63_\alpha$ and $63_\beta$ that are openings in two field stops in a focus detection area are supposed to lie near a predetermined imaging plane 62 (not shown) equivalent to the imaging plane, and provided corresponding to the respective field apertures $63_\alpha$ and $63_\beta$ are a condenser lens 64, a pupil division stop aperture 65 that is an opening in a pupil division stop, a re-imaging lens group 66 and a photoelectric transformation plane 67 comprising a light receptor element array provided on a light receptor member 67A which have different optical axes.

And a condenser lens $64_\alpha$ is located near the field aperture $63_\alpha$, and a pupil division stop aperture $65_{\alpha\beta}$ is located at a conjugate position of the virtual area 68a to the condenser lens $64_\alpha$. Near the pupil division stop aperture $65_{\alpha\beta}$ there is a re-imaging lens $66_{\alpha\beta}$ (shown as being integral with $65_{\alpha\beta}$) located, and the re-imaging lens $66_{\alpha\beta}$ is operable to substantially project an image on the field aperture $63_\alpha$ onto the photoelectric transformation plane 67a through the condenser lens $64_\alpha$ and pupil division stop aperture $65_{\alpha\beta}$.

For the purpose of simplification, FIG. 10 shows each re-imaging lens 66 as being integral with the pupil division stop aperture 65 and, at the same time, shows re-imaging lenses $66_{\alpha\beta}$, $66_{\alpha b}$ and $66_{\beta d}$, with openings being defined by pupil division stop apertures $65_{\alpha\beta}$, $65_{\alpha b}$ and $65_{\beta d}$. As shown in FIG. 1(a) and so on, of course, the re-imaging lens 66 may be spaced slightly away from the opening 65 or, alternatively, the pupil division stop aperture 65 may be formed by coating on one surface of the re-imaging lens 66.

The pupil division stop aperture $65_{\alpha b}$ is located at a conjugate position of the virtual area 68b to the condenser lens $64_\alpha$, and near that there is the re-imaging lens $66_{\alpha b}$ (shown as being integral with the pupil division stop aperture $65_{\alpha b}$) located, so that the re-imaging lens $66_{\alpha b}$ is operable to substantially project an image on the field aperture $63_\alpha$ onto the photoelectric transformation 67b through the condenser lens 64$_\alpha$ and pupil division stop aperture 65$_{\alpha b}$.

And near the field aperture 63$_\beta$ there is the condenser lens 64$_\beta$ located, and the pupil division stop aperture 65$_{\alpha\beta}$ is located at a conjugate position of the virtual area 68c to the condenser lens 64$_\beta$. Near that there is the re-imaging lens 66$_{\alpha\beta}$ (shown as being integral with the pupil division stop aperture 65$_{\alpha\beta}$) located, so that the re-imaging lens 66$_{\alpha\beta}$ is operable to refract an image on the field aperture 63$_\beta$ through the condenser lens 64$_{2\beta}$ and substantially project it onto the photoelectric transformation plane 67c through the pupil division stop aperture 65$_{\alpha\beta}$.

The pupil division stop aperture 65$_{\beta d}$ is located at a conjugate position of the virtual area 68d to the condenser lens 64$_\beta$. Near that there is the re-imaging lens 66$_{\beta d}$ (shown as being integral with 65$_{\beta d}$) located, so that the re-imaging lens 66$_{\beta d}$ is operable to refract an image on the field aperture 63$_\beta$ through the condenser lens 64$_\beta$ and substantially project it onto the photoelectric transformation plane 67d through the pupil division stop aperture 65$_{\beta d}$.

The respective re-imaging lenses 66 are adjacent to one another.

As shown in FIG. 10, the example here may also be applied to a focus detection apparatus capable of handling phase difference information in different directions. The field apertures 63$_\alpha$ and 63$_\beta$ may be adjacent to each other. Further, if necessary, these focus detection areas may be crossed over one another to obtain the same range-finding point in practical applications.

The example here being constructed like such, the pupil division stop apertures can be closer to the re-imaging lens as compared with a phase difference type of focus detection system of conventional construction, thereby using a lot more light and improving on performance. It is also easy to bring the re-imaging lens group and the photoelectric transformation plane having a light receptor element array closer to the predetermined imaging plane, working favorably for reducing the size of the focal detection system.

FIG. 11(a) is illustrative of a layout for the pupil division stop aperture 65 and re-imaging lens 66 in the example of FIG. 10, and FIG. 11(b) is illustrative of layout for a pupil division stop aperture 165 and a re-imaging lens 167 in the focus detection apparatus handling phase difference information in two directions. With the layout of FIG. 11(a), the number of openings and re-imaging lenses can be decreased, and the re-imaging lenses can get closer to one another so that opening size can be increased, going in favor of light quantity.

Figure 12:
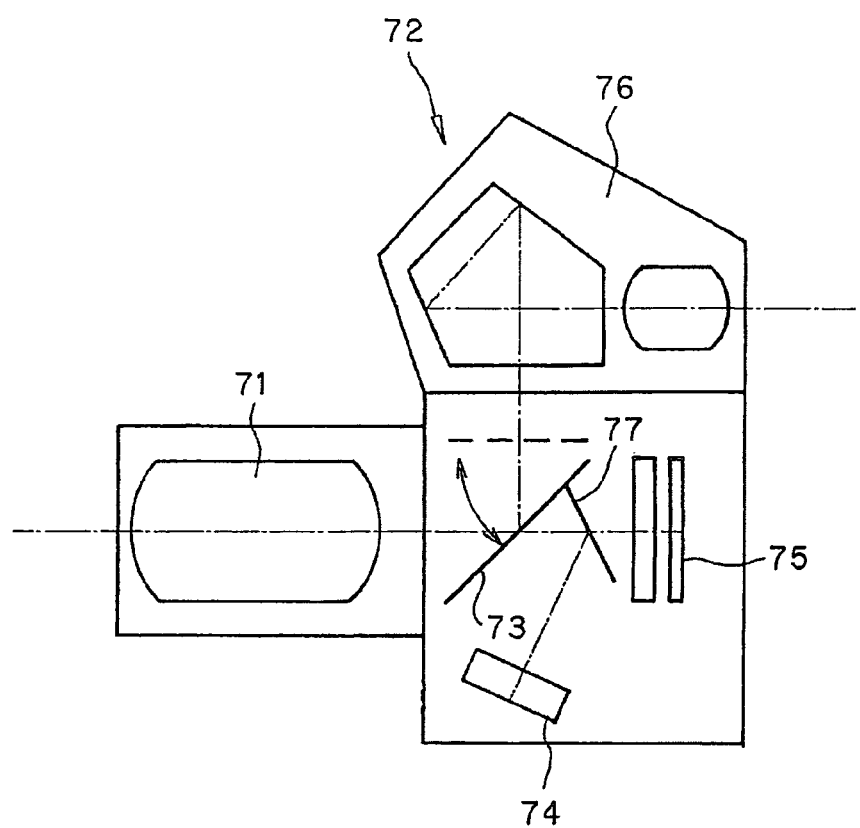
FIG. 12 is illustrative of an example of the focus detection optical system mounted on an imaging apparatus.
Figure 13:
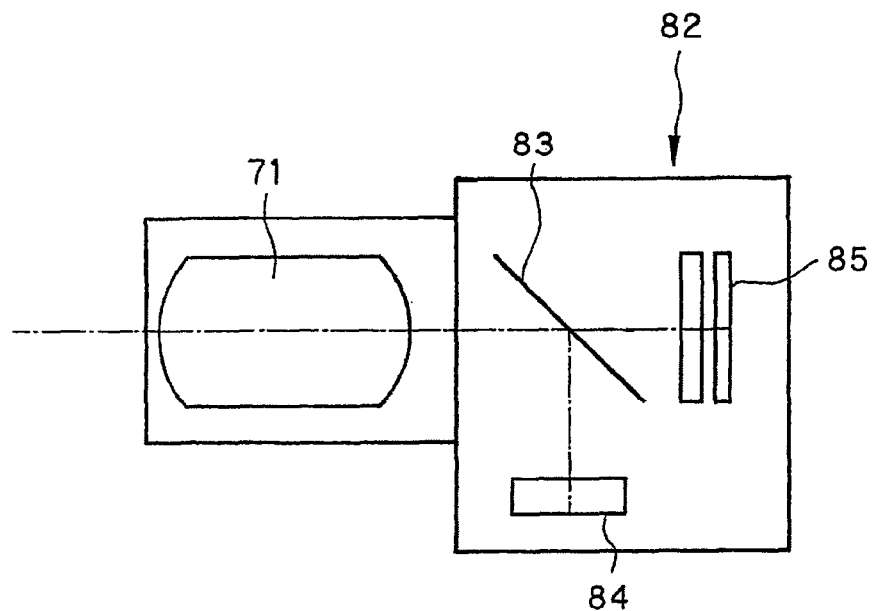
FIG. 13 is illustrative of an example of the focus detection optical system mounted on an imaging apparatus.
Figure 14:
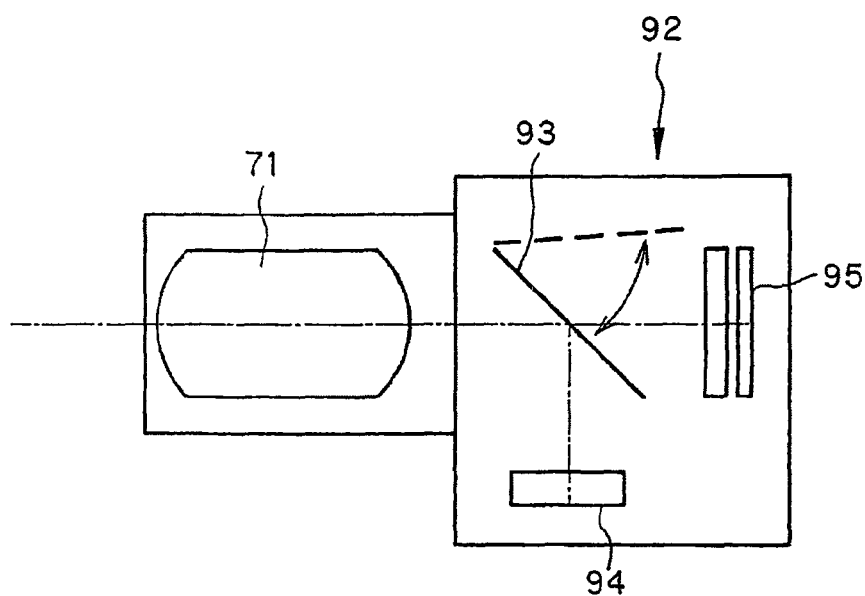
FIG. 14 is illustrative of an example of the focus detection optical system mounted on an imaging apparatus.

FIGS. 12, 13 and 14 are illustrative of applications of the focus detection system to a practical camera body.

FIG. 12 is illustrative of an example of the imaging apparatus wherein a taking lens 71 may be integral with or interchangeable. This imaging apparatus comprises a quick return mirror 73 and a sub-mirror 77 that, upon focus detection or framing, enter an optical path and retracts out of an optical path at the time of taking images. A finder optical system 76 is provided on a path of light reflected off the quick return mirror 73, and an inventive focus detection system 74 is located on a path taken by light reflected off the sub-mirror 77 after transmitting through the quick return mirror 73. On the optical path out of which the quick return mirror 73 and sub-mirror 77 are retracted, there is the imaging plane of an imaging device 75 such as CCC or CMOS located.

In FIG. 13, a half-mirror 83 is located between a taking lens 81 and an imaging plane 85, and an inventive focus detection system 84 is located on a path taken by reflected light. Preferably in this case, the half-mirror 83 is of a thin pellicle construction or antireflection treated on a non-half-mirror surface.

With this method, it is possible to extend the focus detection area across the whole imaging screen range. Here, the finder function for framing and so on may be shown on a liquid crystal screen or the like, using image information obtained from an imaging device.

FIG. 14 is illustrative of one modification to FIG. 12 wherein a quick return mirror 93 is used instead of the half-mirror. Upon focus detection or framing, the quick return mirror 93 enters an optical path and upon taking, it retracts out of the optical path. Preferably in this case, the quick return mirror should be of substantial total reflection construction so that the quantity of light entering the focus detection system can be increased. For framing or the like, image information about much the same area as an image range may be obtained from an output from the inventive focus detection apparatus for display on a liquid crystal screen or the like.

What is claimed is:

1. A focus detection optical system, comprising
a condenser lens located near a focus detection area on a predetermined imaging plane for a taking lens,
a pupil division stop having a pair of openings arranged at a spacing wide enough to make sure focusing precision corresponding to said focus detection area,
a re-imaging lens group having a plurality of re-imaging lenses located corresponding to said openings, and
a light receptor element array located at imaging positions by said re-imaging lenses, wherein:
said light receptor element array is adapted to receive a light intensity distribution of double beams passing through different areas of said taking lens and then through said focus detection area to detect a phase difference of an output signal indicative of a light intensity distribution obtained from said light receptor element array, thereby implementing focus detection for said focus detection area,
said focus detection optical system comprises at least n such focus detection areas that are adjacent to or intersect each other on said predetermined imaging plane, where n≧2,
said re-imaging lens group comprises n+1 such re-imaging lenses,
a (n−1)th re-imaging lens and an nth re-imaging lens are a pair of re-imaging lenses that correspond to said (n−1)th focus detection area and are adjacent to each other,
an nth re-imaging lens and a (n+1)th re-imaging lens are a pair of re-imaging lenses that correspond to said nth focus detection area and are adjacent to each other, and
said (n−1)th re-imaging lens and said (n+1)th re-imaging lens are located at different positions,
wherein said openings corresponding to said first to (n+1) th re-imaging lenses are lined up in a row, and said first to nth focus detection areas are lined up in a row as well.

2. The focus detection optical system according to claim 1, wherein:
the light receptor element arrays corresponding to said first to (n+1)th re-imaging lenses are located on the same light receptor member.

* * * * *